(12) United States Patent
Egawa et al.

(10) Patent No.: US 11,754,133 B2
(45) Date of Patent: Sep. 12, 2023

(54) DISC BRAKE PAD SPRING AND DISC BRAKE DEVICE

(71) Applicant: AKEBONO BRAKE INDUSTRY CO., LTD., Tokyo (JP)

(72) Inventors: Hiroki Egawa, Tokyo (JP); Kenichi Shimamura, Tokyo (JP); Nao Nojiri, Tokyo (JP); Yutaka Nishikawa, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 250 days.

(21) Appl. No.: 17/278,036

(22) PCT Filed: Sep. 19, 2019

(86) PCT No.: PCT/JP2019/036829
§ 371 (c)(1),
(2) Date: Mar. 19, 2021

(87) PCT Pub. No.: WO2020/059823
PCT Pub. Date: Mar. 26, 2020

(65) Prior Publication Data
US 2021/0348661 A1 Nov. 11, 2021

(30) Foreign Application Priority Data
Sep. 21, 2018 (JP) .................................. 2018-177896

(51) Int. Cl.
*F16D 65/40* (2006.01)
*F16D 65/097* (2006.01)
*F16D 55/228* (2006.01)

(52) U.S. Cl.
CPC ....... *F16D 65/0977* (2013.01); *F16D 55/228* (2013.01)

(58) Field of Classification Search
CPC .......................... F16D 55/228; F16D 65/0977
(Continued)

(56) References Cited

U.S. PATENT DOCUMENTS 4,422,534 A 12/1983 Oshima
4,609,077 A 9/1986 Nakatsuhara
(Continued)

FOREIGN PATENT DOCUMENTS

CN 105143704 A 12/2015
CN 106715945 A 5/2017
(Continued)

OTHER PUBLICATIONS

Extended European Search Report dated Feb. 28, 2022 in European Patent Application No. 19862288.8.
(Continued)

*Primary Examiner* — Christopher P Schwartz
(74) *Attorney, Agent, or Firm* — Faegre Drinker Biddle & Reath LLP

(57) ABSTRACT

A disc brake pad spring being attached to a disc brake device in which pads located to sandwich a rotor are supported with a pad support member by inserting in an axial direction pins of the pad support member into a through hole formed in a radially inner side part of a peripheral-direction one-side part of a back plate of the pads, and elastically pressing pads against the pad support member. The disc brake pad spring is formed by a single metal plate, and includes first pressing parts pressing a peripheral-direction one-side part of an outer peripheral edge of the respective back plates of each of the pads toward a radially inner side, and second pressing parts pressing a peripheral-direction one-side surface of the respective back plates of each of pads toward the other peripheral side.

9 Claims, 15 Drawing Sheets

(58) Field of Classification Search
USPC .......................................... 188/73.36–73.38
See application file for complete search history.

(56) References Cited

U.S. PATENT DOCUMENTS

| | | |
|---|---|---|
| 9,377,071 B2 * | 6/2016 | Shimamura ............ F16D 55/228 |
| 2007/0240946 A1 | 10/2007 | Schorn et al. |
| 2010/0284566 A1 | 11/2010 | Hisatomi et al. |
| 2012/0222925 A1 | 9/2012 | Kaneko |
| 2015/0122597 A1 | 5/2015 | Shimamura et al. |
| 2015/0122602 A1 | 5/2015 | Shimamura et al. |
| 2016/0084329 A1 | 3/2016 | Takeo et al. |
| 2017/0307033 A1 | 10/2017 | Toguri et al. |
| 2018/0106310 A1 | 4/2018 | Yokoyama |
| 2018/0345919 A1 | 12/2018 | Nishino et al. |

FOREIGN PATENT DOCUMENTS

| | | |
|---|---|---|
| CN | 108291597 A | 7/2018 |
| DE | 102008020346 A1 | 10/2009 |
| JP | H11-236935 A | 8/1999 |
| JP | 2007-528468 A | 10/2007 |
| JP | 2015-090200 A | 5/2015 |
| JP | 2015-090201 A | 5/2015 |

OTHER PUBLICATIONS

International Search Report dated Dec. 3, 2019 for PCT/JP2019/036829.
Written Opinion dated Dec. 3, 2019 for PCT/JP2019/036829.
The First Office Action dated May 7, 2022 in Chinese Patent Application No. 201980061842.9 (7 pages) with an English translation (8 pages).
English translation of the Written Opinion dated Dec. 3, 2019 in International Application No. PCT/JP2019/036829.

\* cited by examiner

DISC BRAKE PAD SPRING AND DISC BRAKE DEVICE

TECHNICAL FIELD

The invention is related to a disc brake pad spring incorporated in a disc brake device used to brake a vehicle such as an automobile, and a disc brake device including the disc brake pad spring.

BACKGROUND ART

In a disc brake device used to brake a vehicle, a pair of pads are disposed on two sides of a rotor rotatable together with a wheel and, during braking, the pair of pads are pressed against two side surfaces of the rotor. In such a disc brake device, during braking, the pads and a pad support member that supports the pads to be movable may collide with each other and generate abnormal sound called crunch sound (striking sound, click sound). A main cause of the crunch sound is that directions of moments that act on the pads during braking are opposite between forward braking and reverse braking.

Regarding such situation, JP-A-2015-90201 (Patent Literature 1) discloses a structure of a disc brake device in which directions of moments that act on pads during braking are the same between forward braking and reverse braking in order to prevent crunch sound. FIGS. 13 to 15B show the disc brake device described in JP-A-2015-90201. A disc brake device 1 includes a caliper 2 serving as a pad support member, and a pair of an inner pad 3 and an outer pad 4.

The caliper 2 supports the inner pad 3 and the outer pad 4 to be movable in an axial direction (upper-lower direction in FIG. 13, front-back direction in FIG. 14). The caliper 2 includes an inner body 6 and an outer body 7 disposed on two sides in the axial direction of a rotor 5 (see FIG. 13) that rotates together with a wheel, a rotation-in side coupling part 8 and a rotation-out side coupling part 9 each of which connects peripheral-direction two-end parts of the inner body 6 with peripheral-direction two-end parts of the outer body 7 respectively, and a center bridge 10 that connects a peripheral intermediate part of the inner body 6 with a peripheral intermediate part of the outer body 7.

The axial direction (X), the circumferential direction (Y), and a radial direction (Z) refer to an axial direction, a circumferential direction, and a radial direction of the rotor 5 unless otherwise specified.

Each of the inner body 6 and the outer body 7 includes a pin 11 and a guide groove 12 to support the inner pad 3 and the outer pad 4 to be movable in the axial direction (X). Specifically, the pins 11 are coaxially supported with respect to each other respectively at radially inner end parts of peripheral-direction one-side parts of the inner body 6 and the outer body 7. Guide walls 13 protruding in the axial direction (X) are respectively provided on axially inner side surfaces of peripheral-direction other-side parts of the inner body 6 and the outer body 7. Each guide wall 13 has, at a radially intermediate part thereof, the guide groove 12 opening toward the axially inner side surface and a peripheral-direction one-side surface. In the illustrated example, the one peripheral side (Y1) corresponds to a rotation-in side when a vehicle is travelling forward, and the other peripheral side (Y2) corresponds to a rotation-out side when the vehicle is travelling forward.

Each of the inner pad 3 and the outer pad 4 includes a lining 14 and a back plate 15 supporting a back surface of the lining 14. The back plate 15 has a through hole 16 on a radially inner side part of the peripheral-direction one-side part (rotation-in side end part), and includes a convex ear portion 17 protruding in the circumferential direction (Y) on the other peripheral side surface (rotation-out side surface).

In order to support the inner pad 3 and the outer pad 4 as described above to be movable in the axial direction (X) with respect to the caliper 2, the pins 11 are inserted into the through holes 16 provided in the back plates 15 in the axial direction (X). Thus, the peripheral-direction one-side parts of the inner pad 3 and the outer pad 4 are supported to be movable in the axial direction (X) with respect to the inner body 6 and the outer body 7, and a brake tangential force F1 acting on the inner pad 3 and the outer pad 4 is born by the pins 11 during forward braking. The ear portion 17 provided on each back plate 15 is engaged with the guide groove 12 to be movable in the axial direction (X).

A surface facing the center bridge 10 in the circumferential direction (Y) of the rotation-in side coupling part 8 constituting the caliper 2 is a torque receiving surface 18. During reverse braking, the torque receiving surface 18 abuts against a torque transmission surface 19 formed at a radially outer end part of the peripheral-direction one-side part of each back plate 15 to bear a brake tangential force F2 acting on the inner pad 3 and the outer pad 4.

In order to prevent the inner pad 3 and the outer pad 4 from rattling in a non-braking state, the disc brake device 1 is further attached with a pad spring 20. The pad spring 20 is formed by a metal plate and includes a pair of rotation-in side pressing parts 21a, 21b on the one peripheral side (Y1) and a pair of rotation-out side pressing parts 22a, 22b on the other peripheral side (Y2). The pair of rotation-in side pressing parts 21a, 21b respectively press the peripheral-direction one-side parts of outer peripheral edges of the back plates 15 of the inner pad 3 and the outer pad 4 toward a radially inner side. The pair of rotation-out side pressing parts 22a, 22b respectively press the peripheral-direction other-side parts of the outer peripheral edges of the back plates 15 of the inner pad 3 and the outer pad 4 toward the radially inner side.

The disc brake device 1 generates a moment on the inner pad 3 and the outer pad 4 in following directions during braking. This will be described below with reference to FIGS. 15A and 15B.

During forward braking, as illustrated in FIG. 15(A), the brake tangential force F1 directed to the other peripheral side (left side in FIGS. 15A and 15B, rotation-out side) acts on a friction surface center point A of each lining 14 constituting the inner pad 3 and the outer pad (4). The inner pad 3 and the outer pad (4) slightly move toward the other peripheral side (Y2), and the through hole 16, which is provided on the radially inner side relative to an action line of the brake tangential force F1, engages with the pin 11 to bear the brake tangential force F1. For this reason, during forward braking, a moment M1 acts on the inner pad 3 and the outer pad (4) so as to rotate the inner pad 3 and the outer pad (4) counterclockwise.

During reverse braking, as illustrated in FIG. 15B, a brake tangential force F2 directed to the one peripheral side (right side in FIGS. 15A and 15B, rotation-out side) acts on the friction surface center point A of the lining 14. The inner pad 3 and the outer pad 4 slightly move toward the one peripheral side (Y1), and the torque transmission surface 19, which is provided on the radially outer side relative to an action line of the brake tangential force F2 on the peripheral-direction one-side surface of the back plate 15, abuts against the torque receiving surface 18 to bear the brake tangential force F2. For this reason, during reverse braking, a moment M2 in the same direction as the moment M1 acts on the inner pad 3 and the outer pad (4) so as to rotate the inner pad 3 and the outer pad (4) counterclockwise.

As described above, in the disc brake device 1 described in JP-A-2015-90201, directions of the moments M1, M2 that act on the inner pad 3 and the outer pad 4 can be the same during forward braking and reverse braking. For this reason, even when the forward braking and the reverse braking are repeated, postures of the inner pad 3 and the outer pad 4 can be maintained in a state of being rotated counterclockwise. Therefore, since the postures of the inner pad 3 and the outer pad 4 does not need to be changed, crunch sound can be prevented.

The rotation-in side pressing parts 21a, 21b and the rotation-out side pressing parts 22a, 22b constituting the pad spring 20 respectively press peripheral-direction two-side parts of the back plates 15 constituting the inner pad 3 and the outer pad 4 toward the radially inner side. Therefore, in a non-braking state, a radially outer side surface of an inner peripheral surface of the through hole 16 can abut against a radially outer end part of an outer peripheral surface of the pin 11, and a radially inner side surface of the ear portion 17 can abut against a radially inner side surface of the guide groove 12. Therefore, the postures of the inner pad 3 and the outer pad 4 can be stabilized even in the non-braking state, and brake noise can be prevented.

CITATION LIST

Patent Literature

Patent Literature 1: JP-A-2015-90201

SUMMARY OF INVENTION

Technical Problem

However, in the disc brake device 1 described in JP-A-2015-90201, during forward braking, the inner pad 3 and the outer pad 4 move toward the other peripheral side (rotation-out side) by an amount of a gap between the through hole 16 and the pin 11. Therefore, in the disc brake device 1, peripheral-direction one-side surface of the inner peripheral surface of the through hole 16 and a peripheral-direction one-end part of the outer peripheral surface of the pin 11 may collide with each other, which generates an abnormal sound (striking sound).

In consideration of the above-described situations, an object of the present invention is to provide a structure capable of not only preventing occurrence of brake noise in the non-braking state, but also preventing occurrence of abnormal noise based on collision between a through hole formed in a back plate of a pad and a pin provided on a pad support member during forward braking.

Solution to Problem

The disc brake pad spring of the present invention is configured to be attached to a disc brake device and to elastically press a pair of pads.

The disc brake device to be attached includes a pair of pads (an inner pad and an outer pad) located to sandwich a rotor, and a pad support member.

Each of the pair of pads includes a back plate having a through hole on a radially inner side part of a peripheral-direction one-side part which corresponds to a rotation-in side when traveling forward.

On the other hand, the pad support member includes pins disposed in an axial direction.

In the disc brake device, the pins are respectively inserted into the through holes in the axial direction, so as to support the pair of pads with respect to the pad support member.

The disc brake pad spring of the present invention is formed by a single metal plate, and includes a pair of first pressing parts and a pair of second pressing parts.

The pair of first pressing parts are configured to press peripheral-direction one-side part of outer peripheral edge of the respective back plates of each of the pair of pads toward a radially inner side.

The pair of second pressing parts are configured to press peripheral-direction one-side surface of the respective back plates of each of the pair of pads toward the other peripheral side.

In the present invention, the pair of second pressing parts may be configured to press the pair of pads in directions away from each other in the axial direction.

In this case, a radial position in which the pair of second pressing parts respectively press the back plates (a third radial position) may be located between a first radial position on which the pair of first pressing parts respectively press the back plate and a second radial position that is an abutting position between inner peripheral surfaces of the through holes and radially outer side parts of outer peripheral surfaces of the pins.

When the pair of first pressing parts press the pair of pads in the directions away from each other in the axial direction, the pair of second pressing parts may respectively press portions closer to the second radial position than a central part between the first radial position and the second radial position.

Alternatively, when the pair of first pressing parts do not press the pair of pads in the directions away from each other in the axial direction, the pair of second pressing parts press the vicinity of a central part between the first radial position and the second radial position.

In the present invention, the pair of first pressing parts may or may not be configured to press the pair of pads in directions away from each other in the axial direction.

In the present invention, the back plate of each of the pair of pads have a torque transmission surface in the peripheral-direction one-side surface, and the torque transmission surface may abut against a torque receiving surface provided on the pad support member so as to bear a brake tangential force acting on each of the pair of pads during reverse braking.

In this case, the disc brake pad spring of the present invention may further include a pair of sandwiched portions, the pair of sandwiched portions each being disposed between the torque transmission surface and the torque receiving surface.

In the present invention, each of the pair of first pressing parts may be configured to press a part of the outer peripheral edge of the back plate that overlaps in the radial direction with the pin.

A disc brake device of the present invention includes a pair of pads, a pad support member, and a disc brake pad spring.

The pair of pads each include a lining and a back plate that supports a back surface of the lining, and are located sandwich a rotor.

The pad support member supports the pair of pads to be movable in an axial direction.

The disc brake pad spring is configured to elastically press the pair of pads.

Each of the back plates constituting the pair of pads has a through hole on a radially inner side part of a peripheral-direction one-side part.

The pad support member includes a pair of pins inserted into the respective through holes in the axial direction.

In the disc brake device of the present invention, the disc brake pad spring of the present invention is used as the disc brake pad spring.

Advantageous Effects of Invention

According to the present invention as described above, it is possible to not only prevent occurrence of brake noise in a non-braking state, but also prevent occurrence of abnormal noise based on collision between a through hole formed in a back plate of a pad and a pin provided on a pad support member during forward braking.

DESCRIPTION OF EMBODIMENTS

First Example of Embodiment

A first example of an embodiment of the present invention will be described with reference to FIGS. 1 to 11.

A disc brake device 1a of the present example is an opposed piston type disc brake device that is used for braking an automobile. The disc brake device 1a includes a caliper 2a corresponding to the pad support member, a pair of an inner pad 3a and an outer pad 4a, and a disc brake pad spring (hereinafter, referred to as a pad spring) 23 that elastically presses the inner pad 3a and the outer pad 4a.

Figure 8:
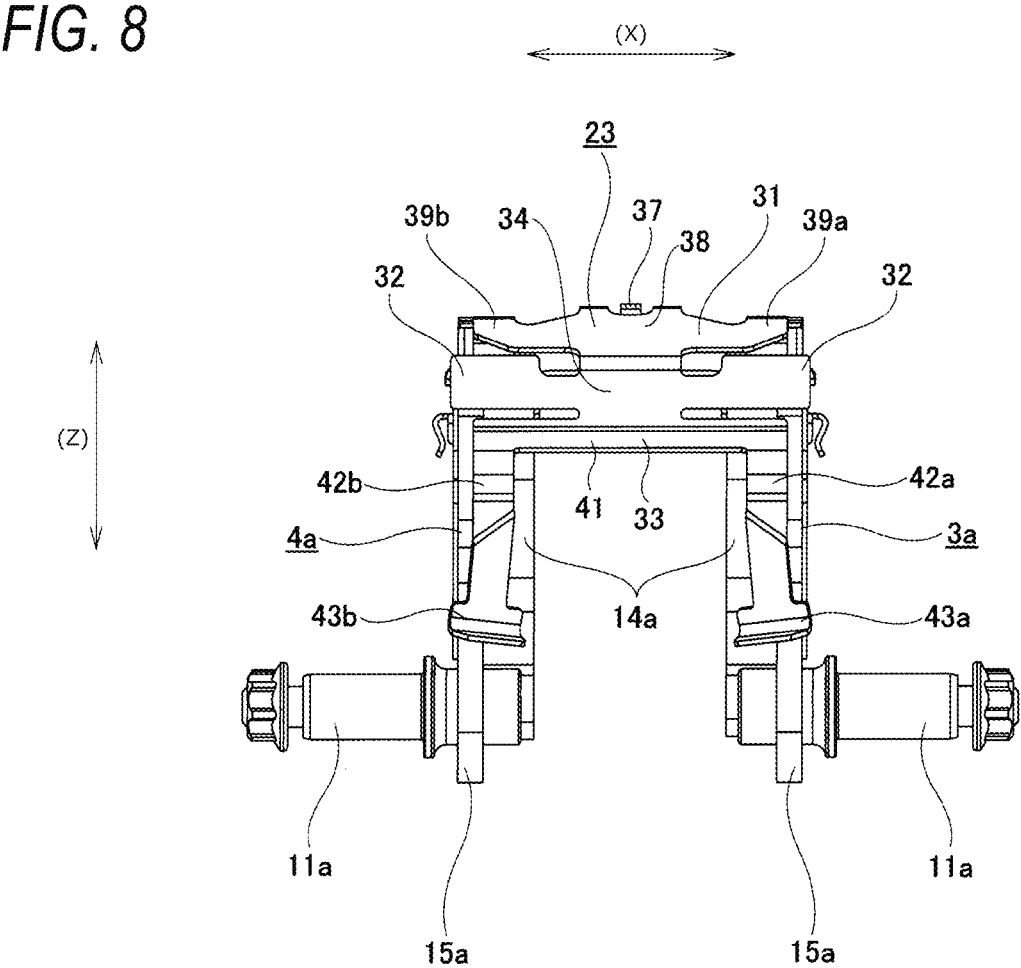
FIG. 8 is a view when the inner pad, the outer pad and the pad spring are taken out and viewed from one peripheral side.
Figure 9:
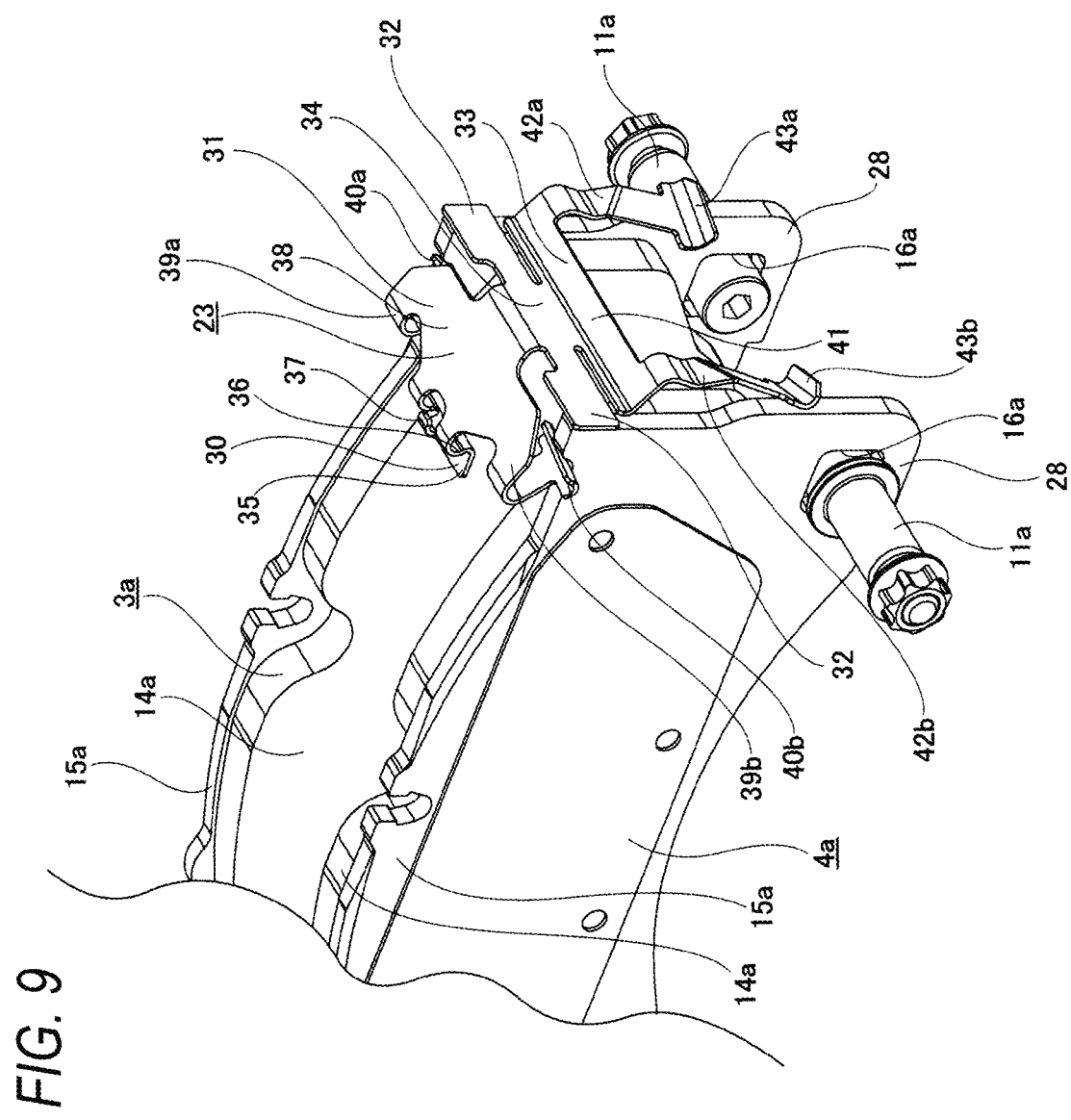
FIG. 9 is a perspective view showing the inner pad, the outer pad and the pad spring taken out and partially omitted.

In the present embodiment, an axial direction (X), a circumferential direction (Y), and a radial direction (Z) refer to an axial direction, a circumferential direction, and a radial direction of a disc-shaped rotor 5 (see FIG. 2) that rotates together with a wheel unless otherwise specified. Front-back directions of FIGS. 1, 4, 5, and 6, upper-lower directions of FIGS. 2 and 7, and left-right directions of FIG. 8 correspond to the axial direction, where a side close to the rotor 5 in the axial direction (X) is referred to as an axially inner side, and a side far from the rotor 5 in the axial direction (X) is referred to as an axially outer side. Left-right directions of FIGS. 1, 2, 4, 5, 6, and 7 and front-back directions of FIG. 8 correspond to the circumferential direction (Y), where right sides of FIGS. 1, 2, 4, 5, 6, and 7 and a front side of FIG. 8 are referred to as one peripheral side (Y1), and left sides of FIGS. 1, 2, 4, 5, 6, and 7 and a back side of FIG. 8 are referred to as the other peripheral side (Y2), respectively. In the present embodiment, the one peripheral side (Y1) is a rotation-in side when a vehicle is travelling forward and a rotation-out side when the vehicle is traveling reversely, and the other peripheral side (y2) is the rotation-out side when the vehicle is travelling forward and the rotation-in side when the vehicle is traveling reversely. Upper-lower directions of FIGS. 1, 4, 5, 6, and 8 and front-back directions of FIGS. 2 and 7 corresponds to the radial direction (Z), upper sides of FIGS. 1, 4, 5, 6, and 8, front sides of FIGS. 2 and 7 correspond to a radially outer side, and lower sides of FIGS. 1, 4, 5, 6, and 8 and back sides of FIGS. 2 and 7 corresponds to a radially inner side. The rotation-in side refers to a side from which the rotor 5 enters the caliper 2a, and the rotation-out side refers to a side from which the rotor 5 comes out of the caliper 2a.

The caliper 2a is supported by the pair of the inner pad 3a and the outer pad 4a to be movable in the axial direction (X), and is integrally formed by performing a casting processing or the like on a light alloy such as an aluminum alloy or a material made of an iron-based alloy. The caliper 2a includes an inner body 6a and an outer body 7a being located to sandwich the rotor 5, a rotation-in side coupling part 8 and a rotation-out side coupling part 9a each of which connects peripheral-direction two-end parts of the inner body 6a with peripheral-direction two-end parts of the outer body 7 respectively, and center bridges 10a, 10b that connect a peripheral intermediate part of the inner body 6a with a peripheral intermediate part of the outer body 7a. The pair of center bridges 10a, 10b are connected to each other in the circumferential direction (Y) at axially intermediate parts thereof. A window portion 24 communicating in the radial direction (Z) is provided between the rotation-in side coupling part 8a and the center bridge 10a on the one peripheral side (Y1).

The inner body 6a and the outer body 7a respectively have a plurality (three in the illustrated example) of inner cylinders 25 and outer cylinders 26. An inner piston and an outer piston (not shown) are fitted respectively on inner sides of the inner cylinders 25 and inner sides of the outer cylinders 26 to be liquid-tight and displaceable in the axial direction (X). The caliper 2a is supported and fixed onto a knuckle of a suspension device by a pair of mounting seats 27 provided in the inner body 6a in a state of covering the rotor 5 from the radially outer sides.

A pair of pins 11a are coaxially supported and fixed (fixedly installed) in the axial direction (X) with respect to each other at radially inner side parts of peripheral-direction one-side parts of the inner body 6a and the outer body 7a. Tip parts of the pins 11a respectively protrude from axially inner side surfaces that face each other of the inner body 6a and the outer body 7a, and face two axial side surfaces of the rotor 5 with gaps therebetween. A portion of each of the pins 11a protruding from the axially inner side surfaces of the inner body 6a and the outer body 7a has a substantially columnar shape and has an outer peripheral surface shape of a cylindrical surface. During forward braking, the pins 11a are respectively engaged with through holes 16a provided in each of the inner pad 3a and the outer pad 4a so as to bear the brake tangential force F1 acting on the inner pad 3a and the outer pad 4a.

Figure 14:
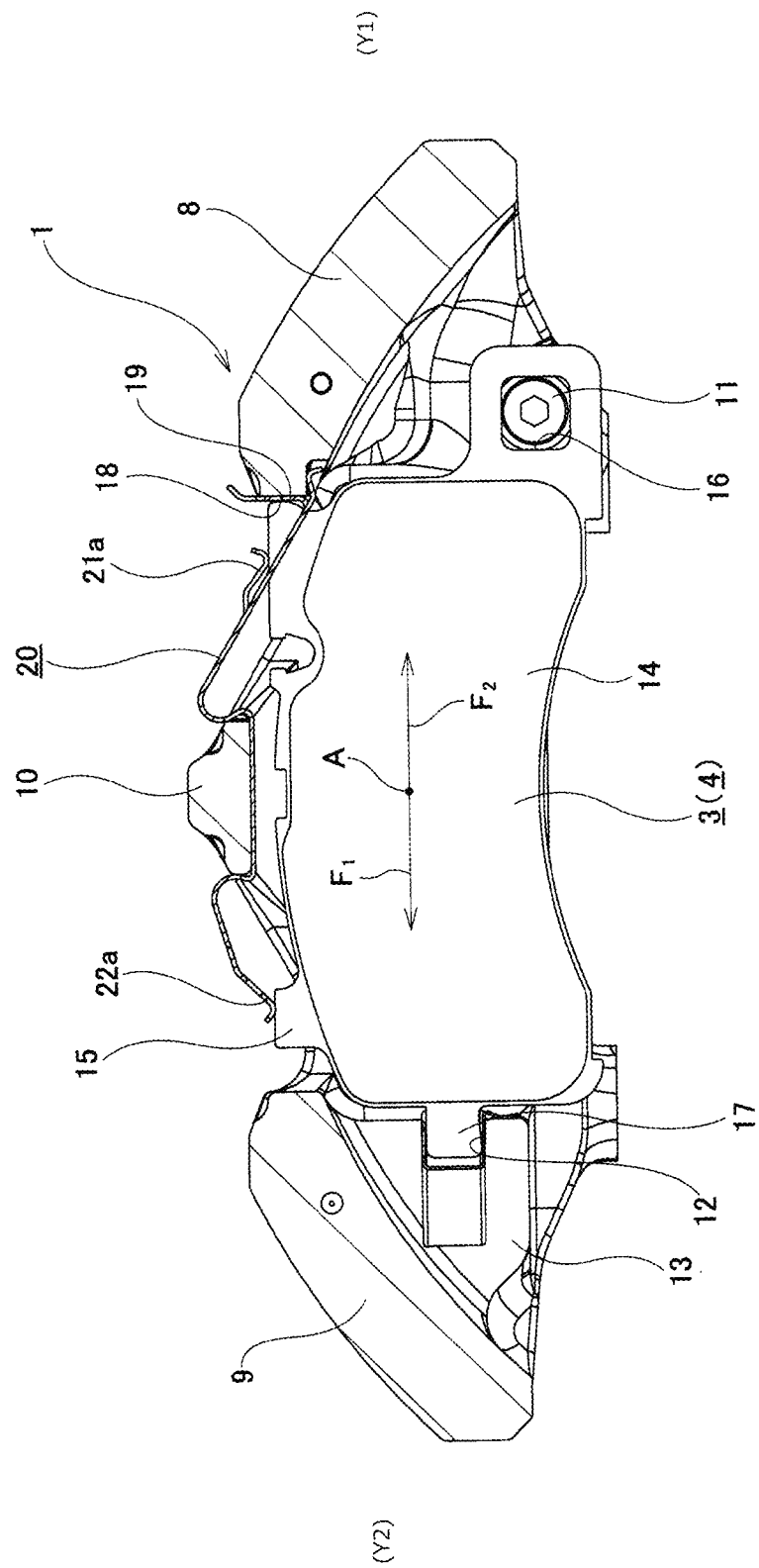
FIG. 14 is a B-B cross-sectional view of FIG. 13.
Figure 15A:
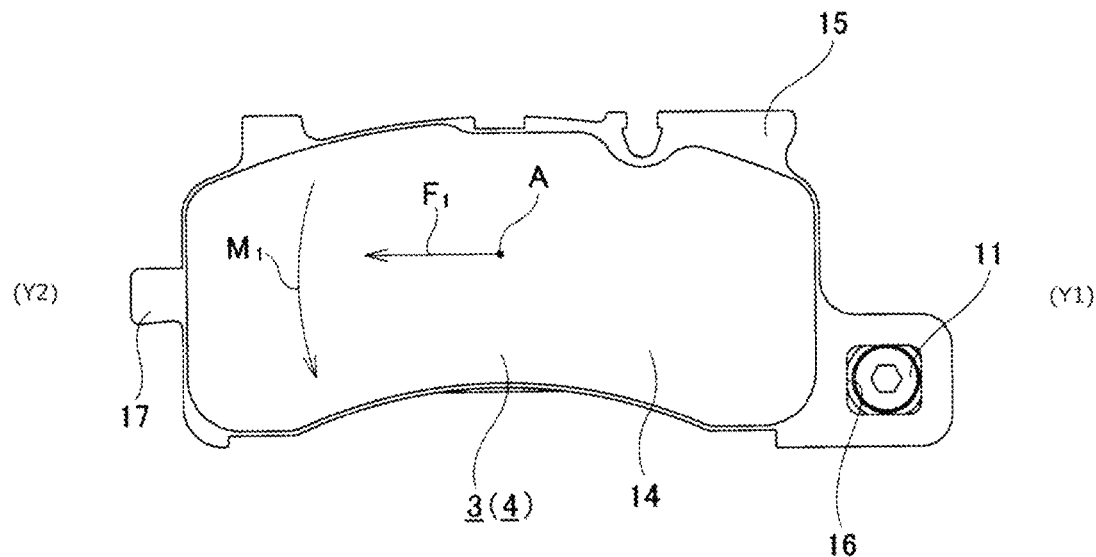
FIG. 15A is front view showing the pad taken out in a state during forward braking.
Figure 15B:
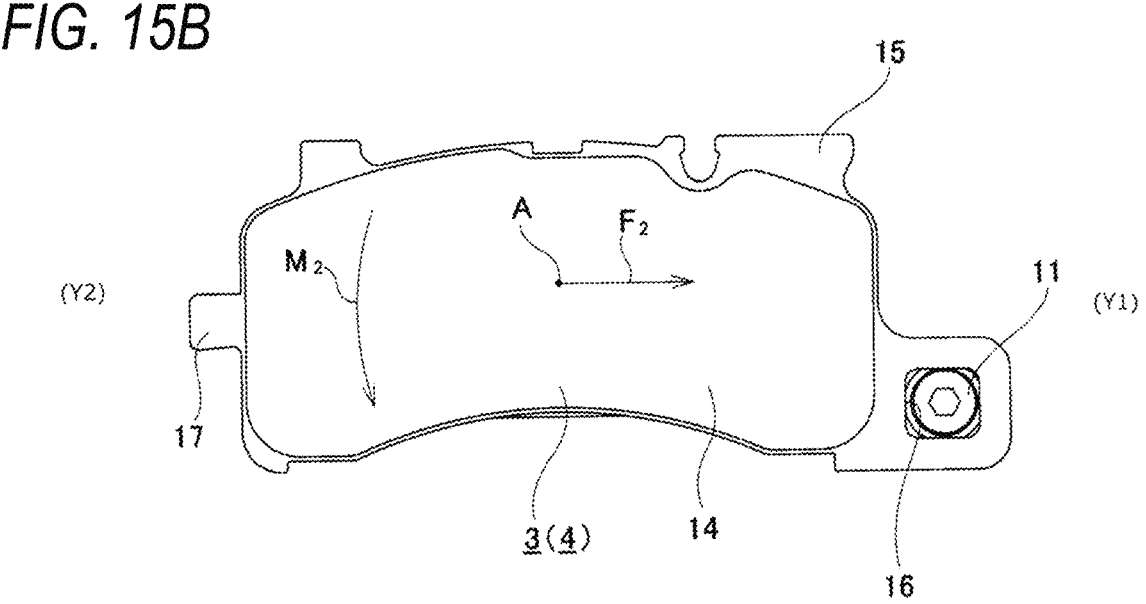
FIG. 15B is front views showing the pad taken out in a state during reverse braking.

As shown in FIG. 14, guide walls protruding in the axial direction (X) are respectively provided on axially inner side surfaces that face each other of peripheral-direction other-side parts of the inner body 6a and the outer body 7a. Each guide wall has, at a radially intermediate part thereof, a guide groove opening toward the axially inner side surface and a peripheral-direction one-side surface.

A surface facing the center bridge 10a in the circumferential direction (Y) of the rotation-in side coupling part 8a is a flat torque receiving surface 18a. The torque receiving surface 18a is on a virtual plane orthogonal to a brake tangential force. During reverse braking, the torque receiving surface 18a is engaged with torque transmission surfaces 19a respectively provided on the inner pad 3a and the outer pad 4a, which will be describe later, so as to bear a brake tangential force F2 acting on the inner pad 3a and the outer pad 4a.

Each of the inner pad 3a and the outer pad 4a includes a lining (friction material) 14a and a metal back plate (pressure plate) 15a supporting a back surface of the lining 14a. In this example, shapes of peripheral-direction two-end parts of each of the back plates 15a constituting the inner pad 3a and the outer pad 4a are asymmetric with respect to the circumferential direction (Y).

Specifically, a radially inner side part of a peripheral-direction one-end part (rotation-in side end part) of each back plate 15a has a shape protruding in the circumferential direction (Y) from the lining 14a. This part is referred to as a substantially triangular plate shaped protruding portion 28. A part of the protruding portion 28 that is located on a radially inner side relative to an action line of a brake tangential force that acts during braking (frictional surface center point A) is formed with the through hole 16a, which penetrates in the axial direction (X) and has a substantially rectangular shape. In a peripheral-direction one-side surface of the back plate 15a, a radially outer side end part located on the radially outer side relative to the action line of the brake tangential force that acts during braking is provided with a flat torque transmission surface 19a that faces the torque receiving surface 18a in the circumferential direction (Y). In the peripheral-direction one-side surface of the back plate 15a, a part between the torque transmission surface 19a and the protruding portion 28 is recessed toward the other peripheral side (Y2) relative to the torque transmission surface 19a and the protruding portion 28. A radially outer end part of the peripheral-direction one-end part of the back plate 15a is provided with a projecting portion 29 protruding toward the radially outer side relative to a portion adjacent to the other peripheral side (Y2).

On the other hand, although omitted in the drawings, a radially inner side part of a peripheral-direction other-end part (rotation-out side end part) of the back plate 15a has a shape along the lining 14a, but does not have a protruding portion protruding in the circumferential direction (Y) from the lining 14a. The back plate 15a includes, at a radially intermediate part on a peripheral-direction other-side surface, a convex ear portion 17a projecting toward the other peripheral side (Y2). During braking (forward braking and reverse braking), a radially inner side surface of the ear portion 17a abuts against a radially inner side surface of the guide groove, so as to bear a moment (rotation force) acting on the inner pad 3a and the outer pad 4a.

In order to support the inner pad 3a and the outer pad 4a to be movable in the axial direction (X) with respect to the caliper 2a, the pins 11a respectively supported by the inner body 6a and the outer body 7a are loosely inserted in the axial direction (X) into the through holes 16a provided on the respective back plates 15a constituting the inner pad 3a and the outer pad 4a. The ear portions 17a provided on the respective back plates 15a constituting the inner pad 3a and the outer pad 4a are engaged with the guide grooves respectively provided in the inner body 6a and the outer body 7a to be movable in the axial direction (X). In this state, the torque transmission surface 19a provided on the peripheral-direction one-side surface of each back plate 15a faces the torque receiving surface 18a provided on the rotation-in side coupling part 8a in the circumferential direction (Y).

In the disc brake device 1a according to the present embodiment, the same moment as that in the structure illustrated in FIGS. 13 to 15B described above is generated on the inner pad 3a and the outer pad 4a during braking.

Figure 1:
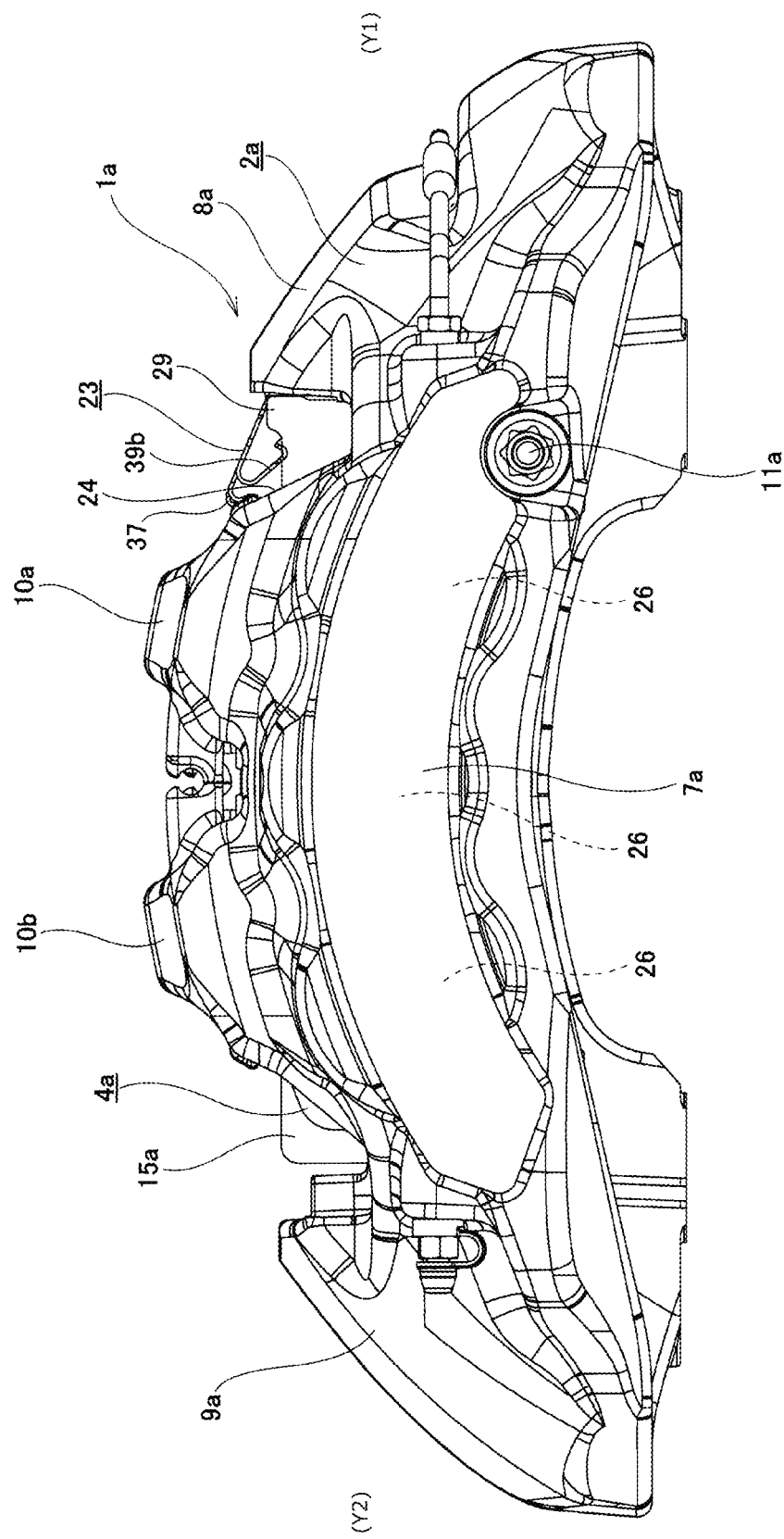
FIG. 1 is a front view showing a disc brake device attached with a pad spring according to a first example of an embodiment of the present invention.
Figure 2:
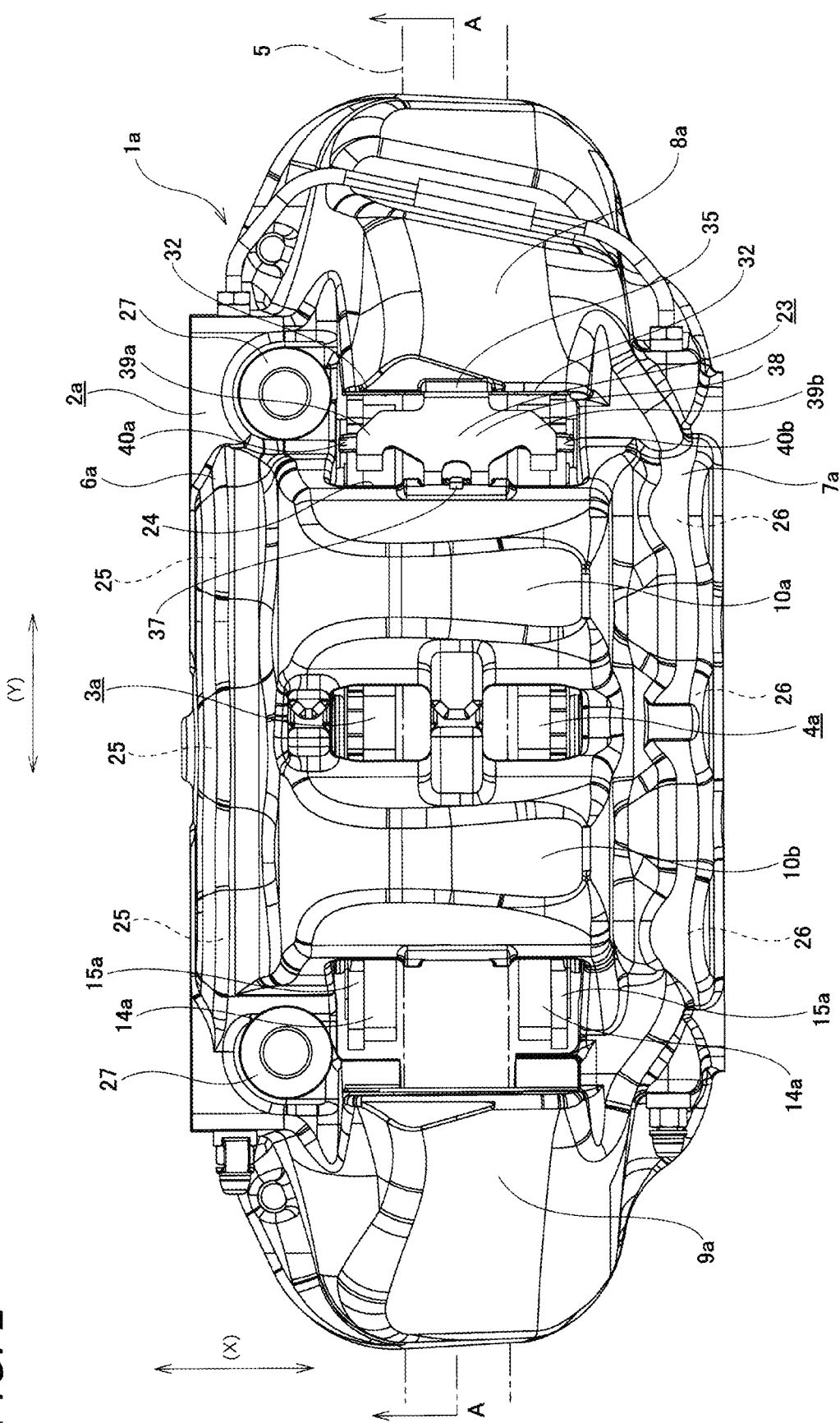
FIG. 2 is a plan view showing the disc brake device attached with the pad spring according to the first example of the embodiment of the present invention.
Figure 3:
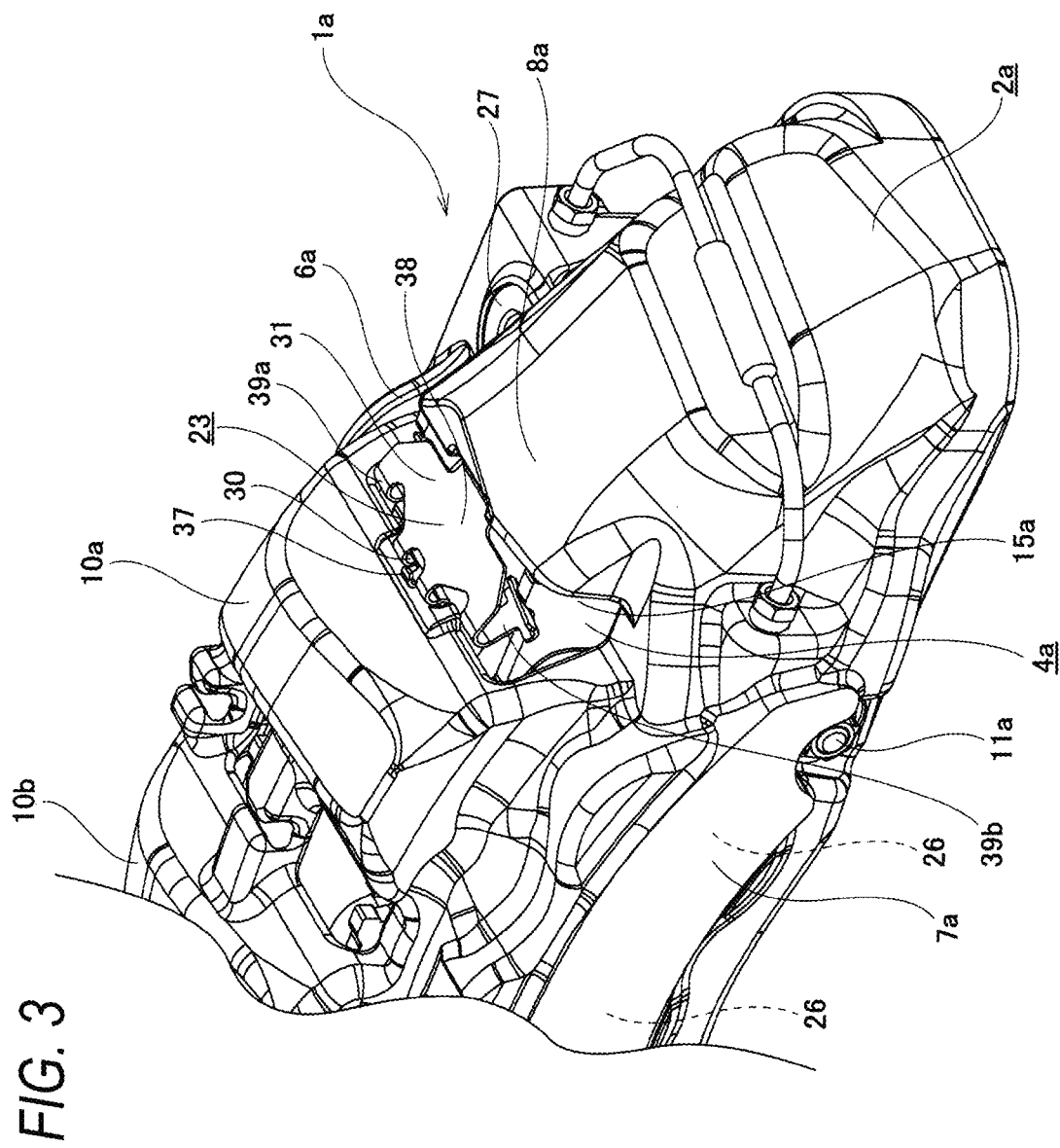
FIG. 3 is a perspective view showing the disc brake device attached with the pad spring according to the first example of the embodiment of the present invention and partially omitted.
Figure 4:
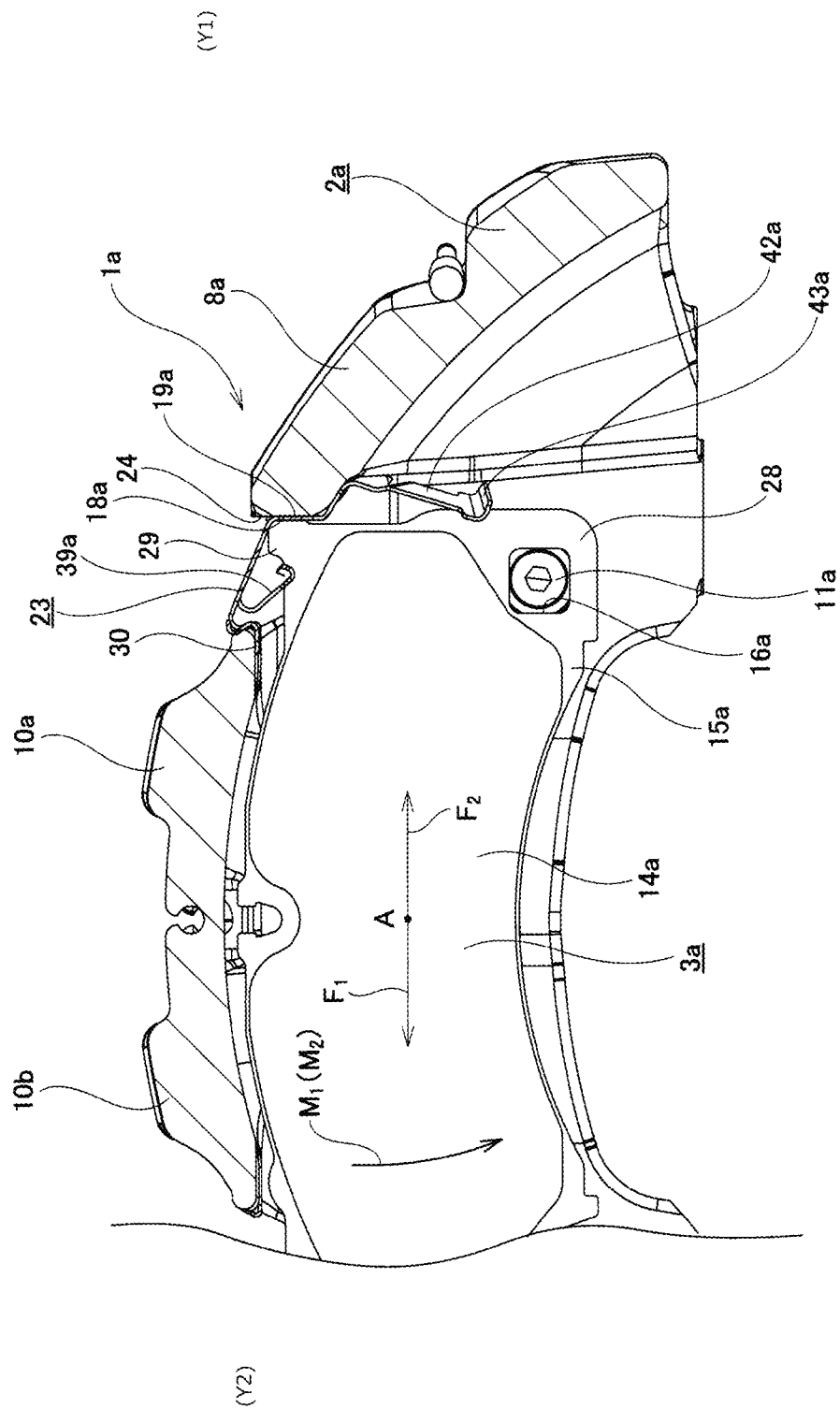
FIG. 4 is a partially omitted cross-sectional view taken along line A-A of FIG. 2.

During forward braking, as illustrated in FIG. 4, the brake tangential force F1 directed to the other peripheral side (left side in FIG. 4, rotation-out side) acts on the friction surface center point A of the lining 14a. The through hole 16a is engaged with the pin 11a to bear the brake tangential force F1 (so-called pull anchor structure). For this reason, during forward braking, the moment M1 in a direction in which the peripheral-direction other-side part is pressed down toward the radially inner side acts on the inner pad 3a and the outer pad 4a. The friction surface center point A is a centroid of a friction surface, which is determined by a diameter, an arrangement, and the like of a piston.

During reverse braking, a brake tangential force F2 directed to the one peripheral side (right side in FIG. 4, rotation-out side) acts on the friction surface center point A of the lining 14a. The torque receiving surface 18a is abutted against the torque transmission surface 19a to bear the brake tangential force F2 (so-called push anchor structure). For this reason, during reverse braking, the moment M2 in the direction in which the peripheral-direction other-side part is pressed down toward the radially inner side (in the same direction as M1) acts on the inner pad 3a and the outer pad 4a.

Therefore, according to the disc brake device 1a according to the present example, directions of the moments M1, M2 acting on the inner pad 3a and the outer pad 4a can be the same during forward braking and reverse braking. For this reason, postures of the inner pad 3a and the outer pad 4a can be maintained in a state of being rotated counter-clockwise even when the forward braking and the reverse braking are repeated as when the vehicle enters a garage or the like. Therefore, since the postures of the inner pad 3a and the outer pad 4a does not need to be changed, crunch sound can be prevented.

Next, the pad spring 23 that elastically presses the inner pad 3a and the outer pad 4a will be described. In this example, a single pad spring 23 is attached to peripheral-direction one-side part of the caliper 2a. A pad spring (including a pad clip) other than the pad spring 23 can be attached to a peripheral-direction other-side part of the caliper 2a, as necessary.

Figure 10B:
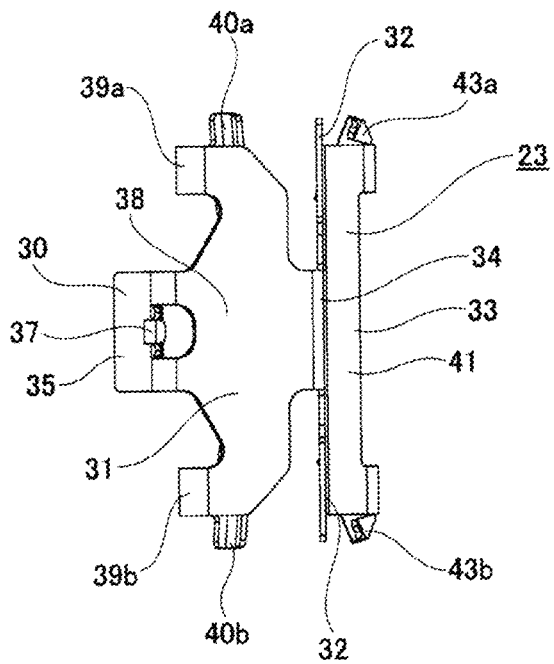
FIG. 10B is a plan view showing the pad spring taken out.
Figure 10A:
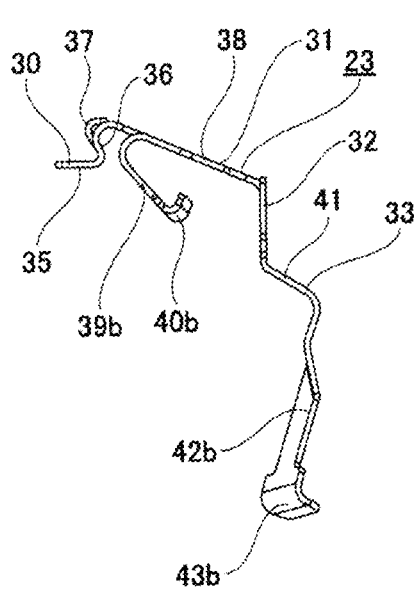
FIG. 10A is a front view showing the pad spring taken out.
Figure 10C:
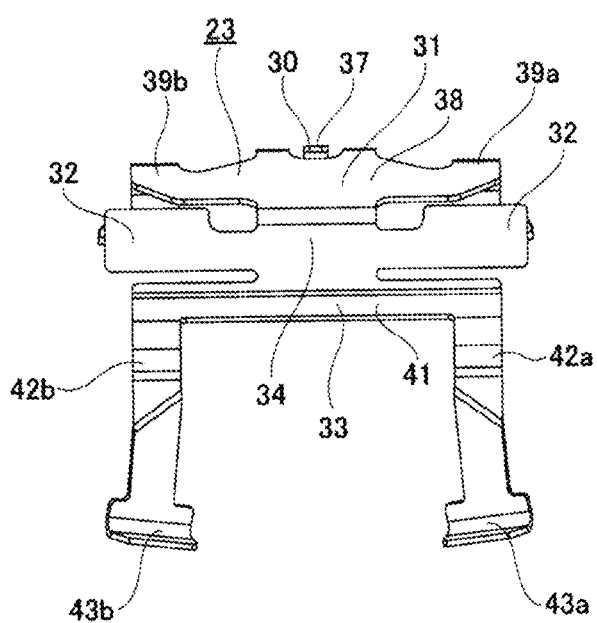
FIG. 10C is a right side view showing the pad spring taken out.
Figure 11:
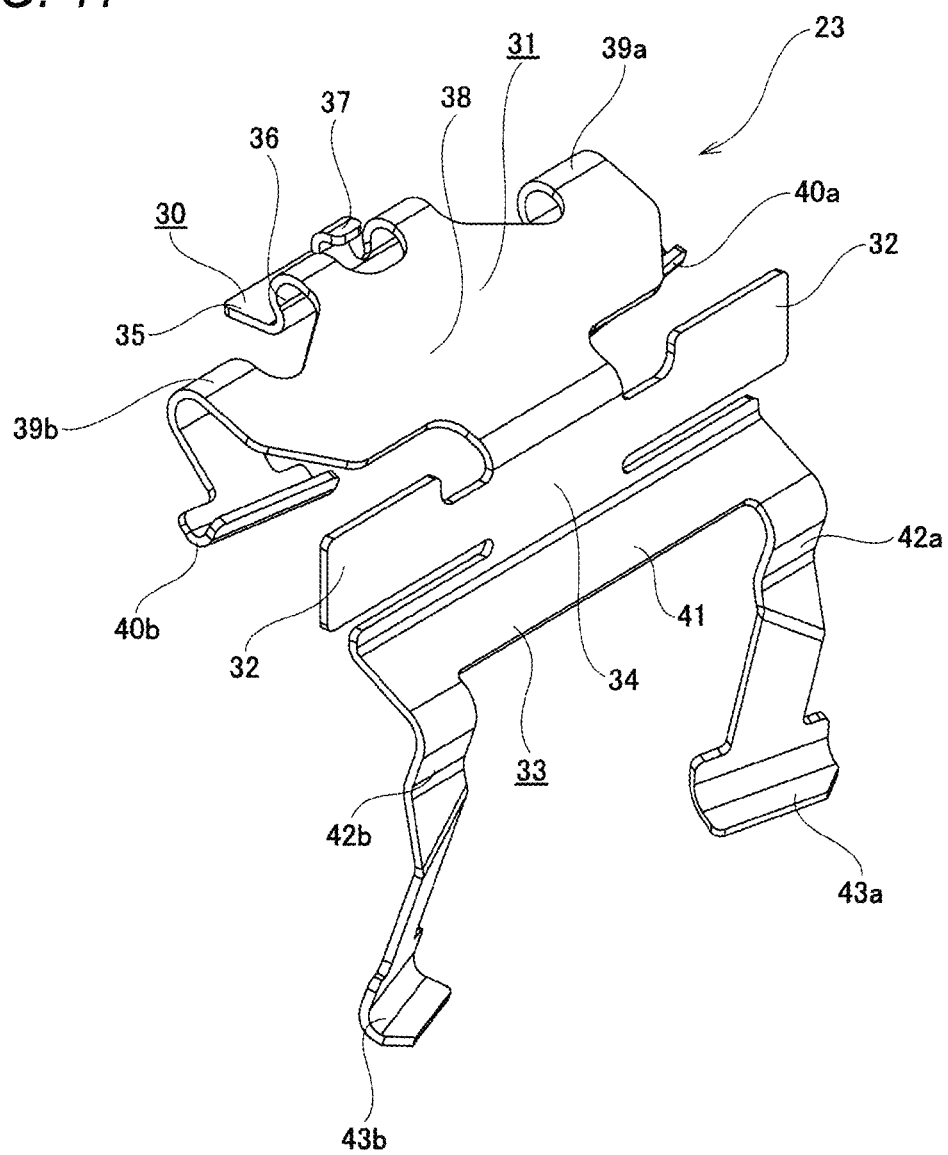
FIG. 11 is a perspective view showing the pad spring taken out.

As shown in FIGS. 10A to 11, the pad spring 23 is formed by bending a single metal plate having elasticity and corrosion resistance, such as a stainless steel plate, and is bent in a substantially L shape as a whole. The pad spring 23 has a radially outer side part disposed inside the window portion 24, and has a radially intermediate part to inner part disposed on the one peripheral side (Y1) of the inner pad 3a and the outer pad 4a. The pad spring 23 includes a locking portion 30, a substantially U-shaped first bifurcated portion 31, a pair of flat sandwiched portions 32, and a substantially U-shaped second bifurcated portion 33 in order from the other peripheral side (Y2) to the one side (from the radially outer side to inner side), and the entire pad spring 23 is symmetrical with respect to the axial direction (X). The first bifurcated portion 31 and the second bifurcated portion 33 are connected to each other by a coupling plate portion 34 extending in the radial direction (Z), and the pair of sandwiched portions 32 are disposed on two sides in the axial direction of the coupling plate portion 34.

The locking portion 30 has a substantially L-shape and is elastically locked to a peripheral-direction one-end part of the center bridge 10a. The locking portion 30 includes a rectangular plate-shaped push-up plate portion 35 that abuts against a radially inner side surface of the center bridge 10a, and an upright plate portion 36 that is bent from a peripheral-direction one-end part of the push-up plate portion 35 toward the radially outer side. An axially intermediate part of the upright plate portion 36 is formed with a bent-up portion 37 formed by bending up an inner portion of a substantially U-shaped notch toward the other peripheral side (Y2). The push-up plate portion 35 elastically presses the radially inner side surface of the center bridge 10a toward the radially outer side. The bent-up portion 37 elastically presses a peripheral-direction one-side surface of the center bridge 10a toward the other peripheral side (Y2).

In an attached state of the pad spring 23, the first bifurcated portion 31 is disposed inside the window portion 24, and elastically presses peripheral-direction one-side part of the outer peripheral edge of the respective back plates 15a constituting the inner pad 3a and the outer pad 4a, and the peripheral-direction one-side part is disposed at a one side of the back plate 15a in a peripheral direction of the rotor 5. The first bifurcated portion 31 includes a first base plate portion 38 having a substantially flat plate shape extending in the axial direction (X) and a pair of first pressing parts 39a, 39b. The first base plate portion 38 has a peripheral-direction other-end part connected to a radially outer end part of the upright plate portion 36, and is inclined toward the radially inner side as it moves toward the one peripheral side (Y1).

The first pressing parts 39a, 39b are disposed on two axial sides of the first base plate portion 38. The first pressing parts 39a, 39b each have a substantially U-shape, and respectively extend from two axial end parts of the first base plate portion 38 toward the other peripheral side (Y2) and are folded back by 180 degrees toward the radially inner side and toward the one peripheral side (Y1) from the respective intermediate parts. Distal parts (radially inner end part) of the first pressing parts 39a, 39b are respectively provided with first fold-back portions 40a, 40b, whose radially inner sides are convex curved surfaces. An axial width of the first fold-back portions 40a, 40b is greater than an axial width of base end parts to intermediate parts of the first pressing parts 39a, 39b. The first fold-back portions 40a, 40b are inclined toward the radially inner side as approaching each other (closer to the rotor 5) with respect to the axial direction (X). Such first fold-back portions 40a, 40b elastically press the peripheral-direction one-side part of the outer peripheral edge of the respective back plates 15a constituting the inner pad 3a and the outer pad 4a toward the radially inner side and toward the axially outer side. In this example, the first fold-back portions 40a, 40b each press a portion that overlaps in the radial direction (Z) with the pin 11a and is located the other peripheral side (Y2) relative to the projecting portion 29 provided at the peripheral-direction one-end part, in the outer peripheral edge of the back plate 15a.

In the attached state of the pad spring 23, the second bifurcated portion 33 is disposed on the one peripheral side (Y1) of the inner pad 3a and the outer pad 4a, and elastically presses radially intermediate part of the peripheral-direction one-side surface of the respective back plates 15a constituting the inner pad 3a and the outer pad 4a. The second bifurcated portion 33 includes a second base plate portion 41 extending in the axial direction (X) and a pair of second pressing parts 42a, 42b. The second base plate portion 41 has an axially intermediate part of a radially outer end part connected to the coupling plate portion 34, and has a radially intermediate part to inner end part inclined toward the one peripheral side (Y1) as it moves toward the radially inner side. The second pressing parts 42a, 42b are disposed on two axial sides of the second base plate portion 41. The second pressing parts 42a, 42b extend radially from two axial end parts of the second base plate portion 41 toward the radially inner side, and have peripheral-direction one-side surfaces twisted to face each other. Distal parts (radially inner end part) of the second pressing parts 42a, 42b are respectively provided with second fold-back portions 43a, 43b, whose radially inner sides are convex curved surfaces. An axial width of the second fold-back portions 43a, 43b is greater than an axial width of base end parts to intermediate parts of the second pressing parts 42a, 42b. The second fold-back portions 43a, 43b are inclined toward the other peripheral side (Y2) as approaching each other with respect to the axial direction (X). Such second fold-back portions 43a, 43b elastically press the radially intermediate part of the peripheral-direction one-side surface of the respective back plates 15a constituting the inner pad 3a and the outer pad 4a toward the other peripheral side (Y2) and toward the axially outer side. In other words, the second fold-back portions 43a, 43b elastically press the radially intermediate part of the peripheral-direction one-side surface of the respective back plates 15a constituting the inner pad 3a and the outer pad 4a toward the other side in the peripheral direction and toward the axially outer side, and the peripheral-direction one-side surface is disposed at the one side of the back plate 15a in the peripheral direction.

Figure 5:
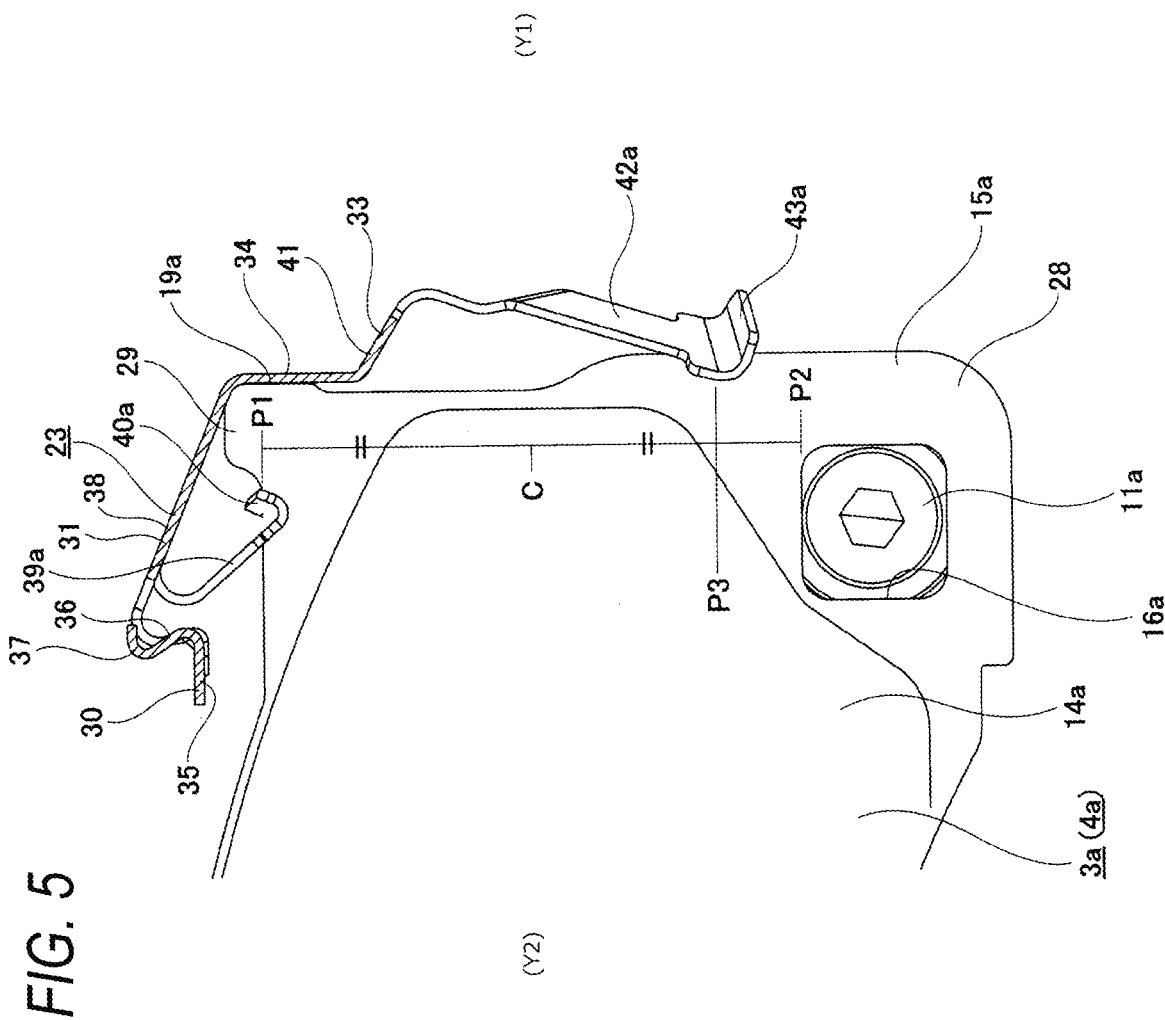
FIG. 5 is a right side enlarged view of FIG. 4 showing an inner pad and a pad spring taken out.
Figure 6:
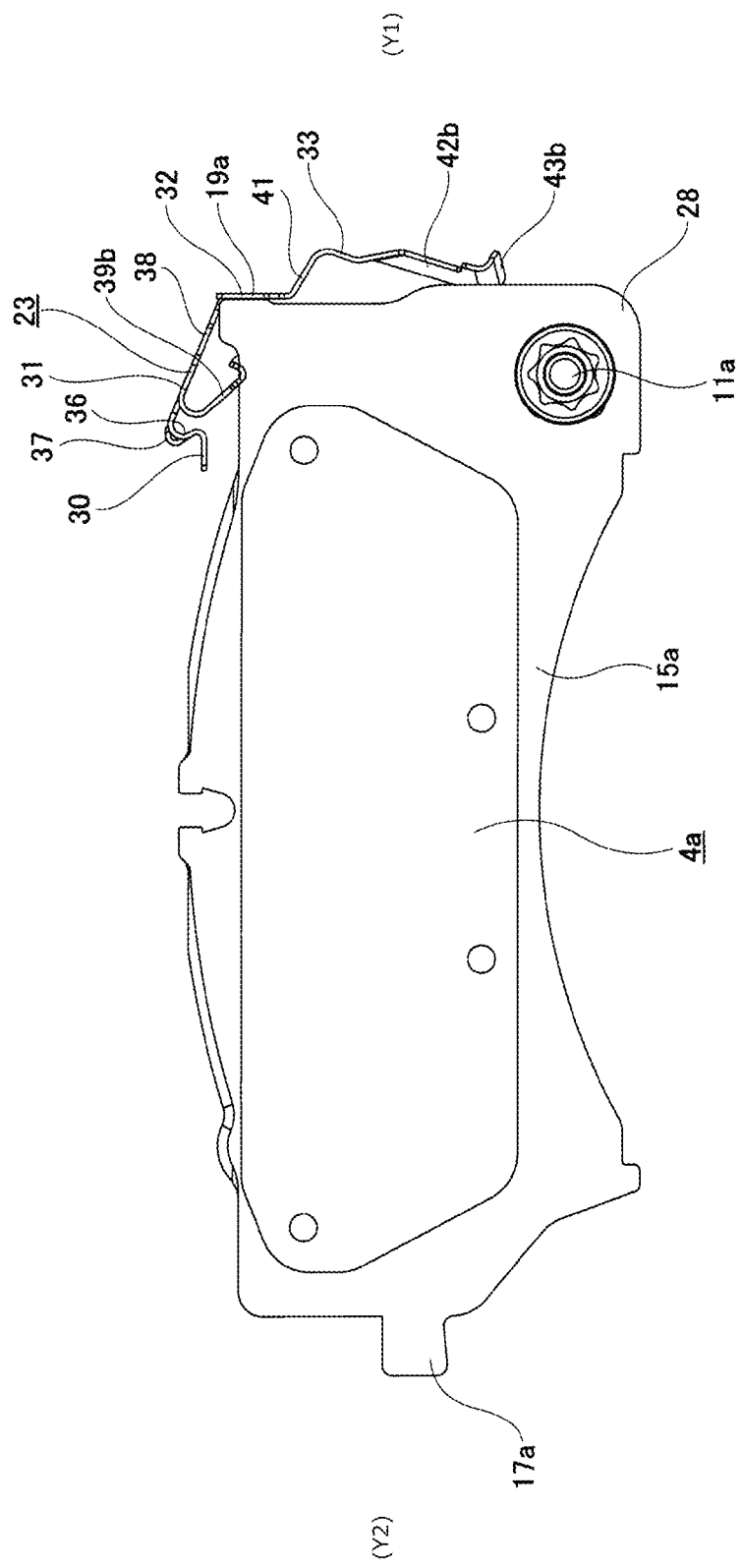
FIG. 6 is a view when the inner pad, an outer pad and the pad spring are taken out and viewed from an axially outer side.
Figure 7:
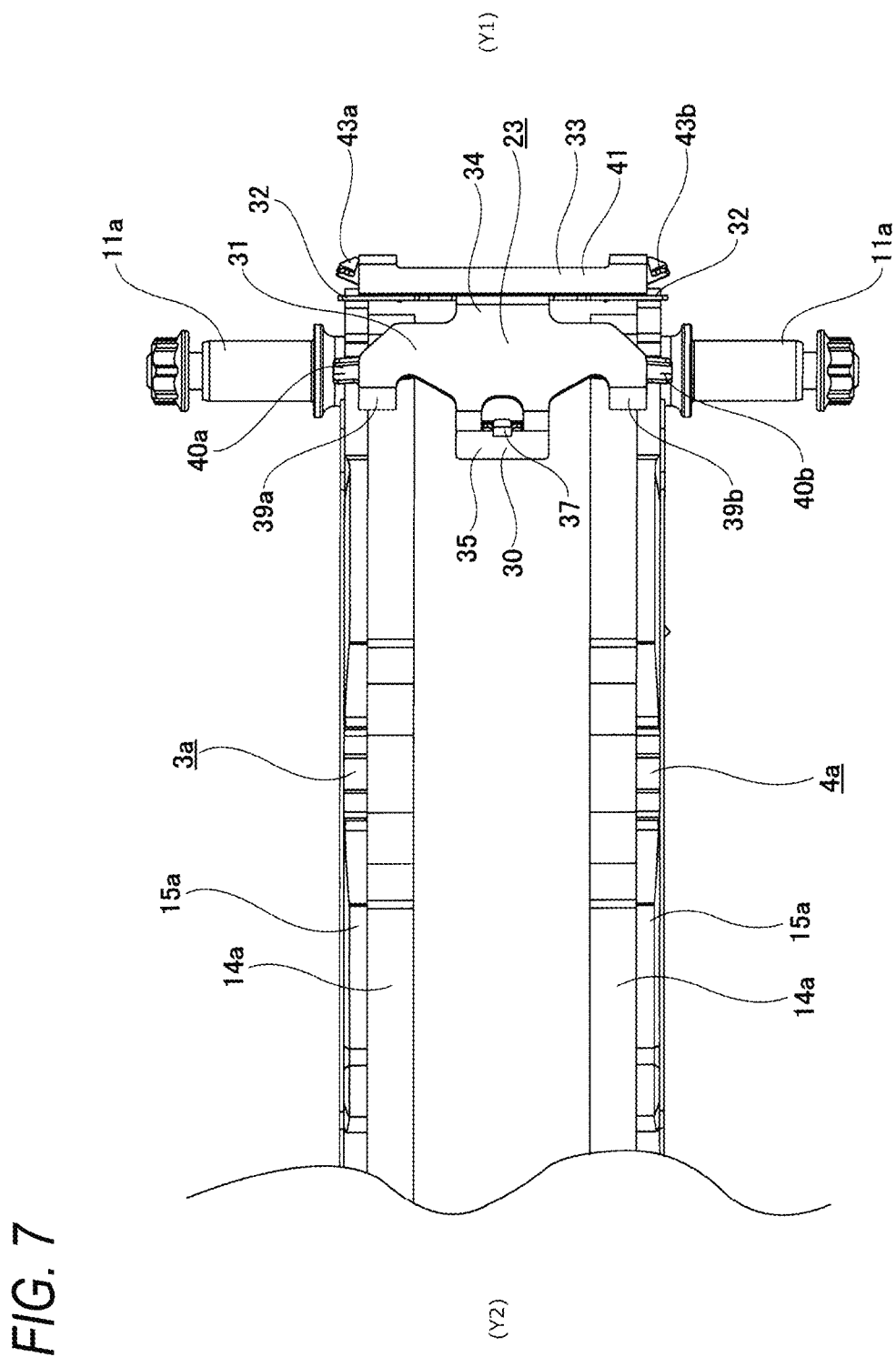
FIG. 7 is a view when the inner pad, the outer pad and the pad spring are taken out and viewed from a radially outer side.

In this example, as shown in FIG. 5, a third radial position P3 where the second fold-back portions 43a, 43b respectively press the peripheral-direction one-side surfaces of the back plates 15a is located between a first radial position P1 on which the first fold-back portions 40a, 40b respectively press the outer peripheral edges of the back plates 15a and a second radial position P2 that is an abutting position between the radially outer side surfaces of the inner peripheral surfaces of the through holes 16a and radially outer end parts of the outer peripheral surfaces of the pins 11a. In particular, in this example, the inner pad 3a and the outer pad 4a are pressed in directions away from each other in the axial direction (X) by the first fold-back portions 40a, 40b. Therefore, the third radial position P3 is located closer to the second radial position P2 than a central part C between the first radial position P1 and the second radial position P2. In other words, a radial distance from the third radial position P3 to the second radial position P2 is shorter than a radial distance from the third radial position P3 to the first radial position P1.

The coupling plate portion 34 is formed in a substantially flat plate shape and extends in the radial direction (Z). The coupling plate portion 34 connects an axially intermediate part of a peripheral-direction one-end part of the first base plate portion 38 constituting the first bifurcated portion 31 and an axially intermediate part of a radially outer end part of the second base plate portion 41 forming the second bifurcated portion 33 with each other.

The pair of sandwiched portions 32 are each formed in a flat plate shape, and are disposed on two axial sides of a radially intermediate part of the coupling plate portion 34.

In the pad spring 23 as described above, the push-up plate portion 35 and the pair of first pressing parts 39a, 39b are stretched in the radial direction (Z) between the radially inner side surface of the center bridge 10a and the outer peripheral edges of the back plates 15a, so as to be attached to (elastically supported by) the disc brake device 1a. In such an attached state, the pair of first pressing parts 39a, 39b press the peripheral-direction one-side parts of the outer peripheral edges of the respective back plates 15a constituting the inner pad 3a and the outer pad 4a toward the radially inner side and toward the axially outer side. The pair of second pressing parts 42a, 42b press the peripheral-direction one-side surface of the respective back plates 15a constituting the inner pad 3a and the outer pad 4a toward the other peripheral side (Y2) and toward the axially outer side. The pair of sandwiched portions 32 are positioned between the torque transmission surfaces 19a and the torque receiving surface 18a.

According to the pad spring 23 as described above, it is possible to not only prevent occurrence of brake noise in a non-braking state, but also prevent occurrence of abnormal noise based on collision between the through holes 16a formed in the back plates 15a and the pins 11a supported on the caliper 2a during forward braking.

That is, the pair of first pressing parts 39a, 39b (the first fold-back portions 40a, 40b) constituting the pad spring 23 elastically press the peripheral-direction one-side parts of the outer peripheral edges of the back plates 15a toward the radially inner side. Therefore, in the non-braking state, the radially outer side surfaces of the inner peripheral surfaces of the through holes 16a can abut against the radially outer side end parts of the outer peripheral surfaces of the pins 11a, and the radially inner side surfaces of the ear portions 17a can abut against the radially inner side surfaces of the guide grooves. Moreover, in this example, since the first fold-back portions 40a, 40b press the portions of the outer peripheral edges of the back plates 15a that overlap in the radial direction (Z) with the pins 11a, the inner peripheral surfaces of the through holes 16a can be reliably pressed against the outer peripheral surfaces of the pins 11a due to a pressing force of the first pressing parts 39a, 39b. Therefore, the posture of the inner pad 3a and the outer pad 4a can be stabilized even in the non-braking state, and brake noise can be prevented.

The pair of second pressing parts 42a, 42b (second fold-back portions 43a, 43b) elastically press the peripheral-direction one-side surfaces of the back plates 15a toward the other peripheral side (Y2). Therefore, in the non-braking state, the peripheral-direction one-side surfaces of the inner peripheral surfaces of the through holes 16a can keep abutting against the peripheral-direction one-end parts of the outer peripheral surfaces of the pins 11a. Therefore, during forward braking, even when the brake tangential force F1 directed to the other peripheral side (Y2) acts on the friction surface center point A of the linings 14a, it is possible to prevent the inner pad 3a and the outer pad 4a from moving toward the other peripheral side (Y2), and prevent the through holes 16a and the pins 11a from collision. As a result, it is possible to prevent occurrence of abnormal noise based on the collision between the through holes 16a and the pins 11a.

The pair of first pressing parts 39a, 39b (first fold-back portions 40a, 40b) and the pair of second pressing parts 42a, 42b (second fold-back portions 43a, 43b) impart an elastic force to the inner pad 3a and the outer pad 4a in directions away from each other with respect to the axial direction (X). Therefore, in the non-braking state, the side surface of the respective linings 14a constituting the inner pad 3a and the outer pad 4a can be separated from the side surface of the rotor 5, and these side surfaces can be prevented from friction. Therefore, it is possible to prevent drag of the inner pad 3a and the outer pad 4a, and to prevent occurrence of judder.

In addition, the third radial position P3 in which the second pressing parts 42a, 42b (second fold-back portions 43a, 43a) press the peripheral-direction one-side surfaces of the back plates 15a is located closer to the second radial position P2 than the central part C between the first radial position P1 and the second radial position P2. Therefore, the inner pad 3a and the outer pad 4a can be separated from each other in the axial direction (X) without greatly inclining with abutting portions between the through holes 16a and the pins 11a as a fulcrum. The reason for this will be described below.

A force (Fy) directed to the radially inner side and acting on the outer peripheral edges of the back plates 15a from the pair of first pressing parts 39a, 39b acts on the abutting portions between the radially outer side surfaces of the inner peripheral surfaces of the through holes 16a and the radially outer end parts of the outer peripheral surfaces of the pins 11a. Therefore, a reaction force {f2=pressing force (Fy)× friction coefficient (μ2) between through holes 16a and pins 11a} against a force (Fx1) directed to the axially outer side and acting on the back plates 15a from the first pressing parts 39a, 39b acts on the abutting portions between the through holes 16a and the pins 11a. Therefore, the inner pad 3a and the outer pad 4a tend to incline so that the radially outer side parts thereof are separated from each other with the abutting portions between the through holes 16a and the pins 11a as a fulcrum. Therefore, when the third radial position P3 approaches the first radial position P1, the inclination of the inner pad 3a and the outer pad 4a is likely to become larger, and it becomes difficult to move the inner pad 3a and the outer pad 4a away from each other. Therefore, in this example, the third radial position P3 is located closer to the second radial position P2 than a central part C between the first radial position P1 and the second radial position P2. Thereby, it is possible to move the inner pad 3a and the outer pad 4a away from each other without increasing the inclination of the inner pad 3a and the outer pad 4a.

Further, since the pair of sandwiched portions 32 constituting the pad spring 23 are disposed between the torque transmission surfaces 19a and the torque receiving surface 18a, it is possible to prevent occurrence of rust on the torque transmission surfaces 19a and the torque receiving surface 18a. In addition, the back plates 15a constituting the inner pad 3a and the outer pad 4a can be smoothly displaced in the axial direction (X) with respect to the caliper 2a.

Further, since the first bifurcated portion 31 can be exposed to the window portion 24 in the attachment state of the pad spring 23, it is easy to prevent forgetting to attach the pad spring 23. In addition, since the through holes 16a have a rectangular hole shape and the pins 11a have a circular cross-sectional shape, a contact state when the outer peripheral surfaces of the pins 11a abut against the inner peripheral surfaces of the through holes 16a can be line contact. Therefore, the contact state between the pins 11a and the through holes 16a can be stabilized.

Other configurations and operational effects are the same as those of the structure of the related art as described above.

Second Example of Embodiment

Figure 12:
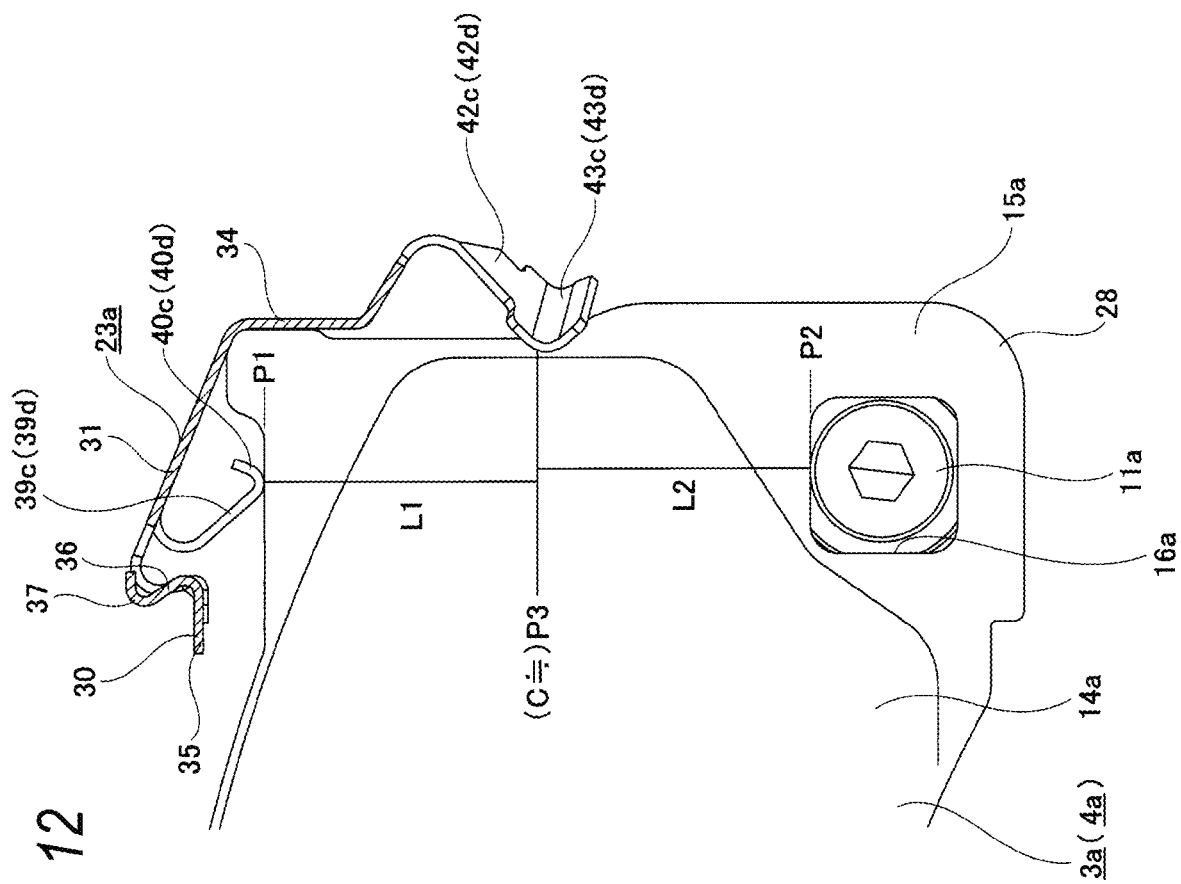
FIG. 12 is a diagram corresponding to FIG. 5 showing a second example of an embodiment of the present invention.
Figure 13:
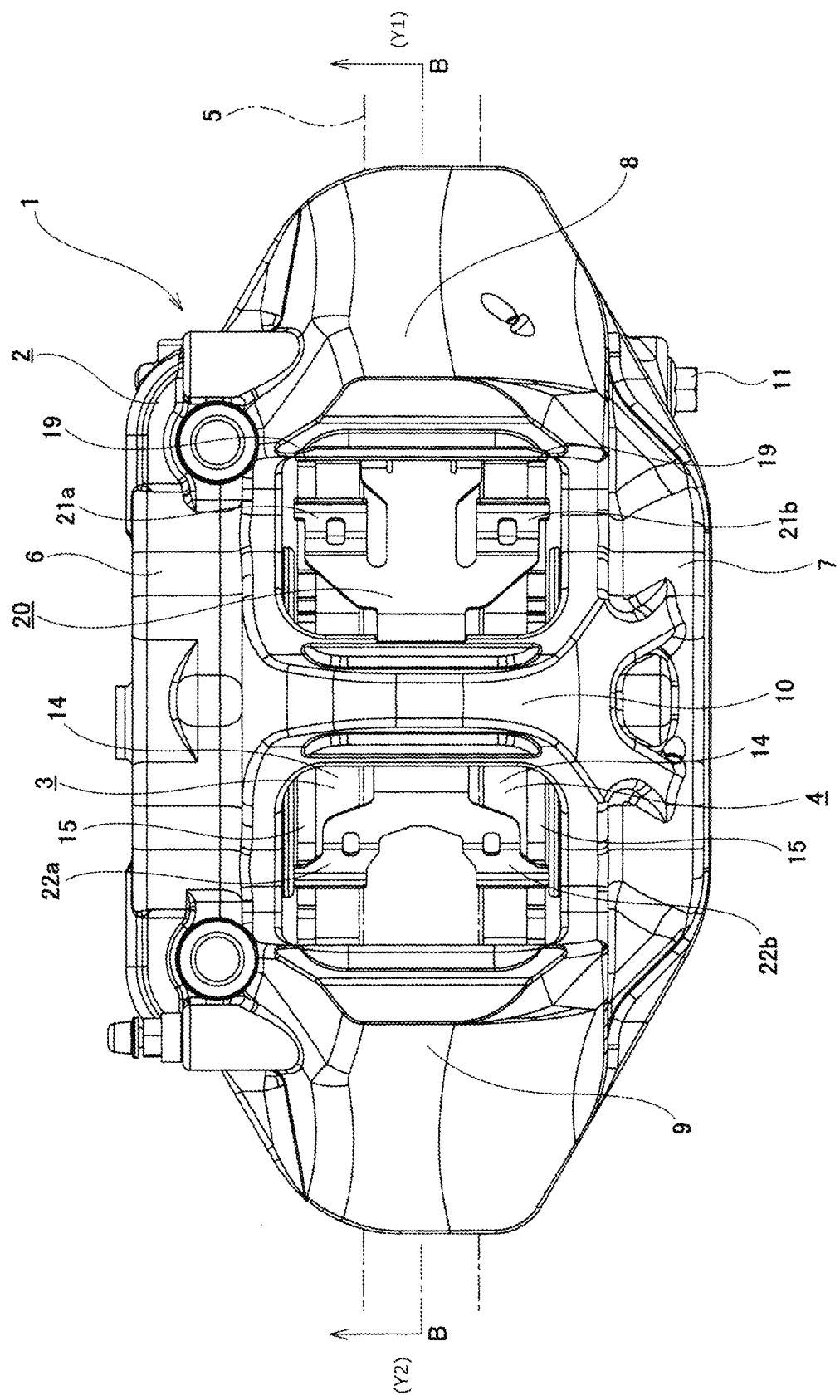
FIG. 13 is a plan view showing a disc brake device having a structure according to related art.

A second example of the embodiment of the present invention will be described with reference to FIG. 12.

In this example, first fold-back portions 40c, 40d provided at the tips of first pressing parts 39c, 39d constituting the pad spring 23a are not inclined to the radial direction (Z), but are arranged in the axial direction (X) (linearly). Therefore, the first pressing parts 39c, 39d (the first fold-back portions 40c, 40d) only press the outer peripheral edge of the respective back plates 15a constituting the inner pad 3a and the outer pad 4a toward the radially inner side, without pressing toward the axially outer side. Therefore, in this example, the third radial position P3 in which second pressing parts 42c, 42d (second fold-back portions 43c, 43d) press the peripheral-direction one-side surfaces of the back plates 15a are different from the first example of the embodiment.

Specifically, the third radial position P3 is located in the vicinity of the central part C between the first radial position P1 on which the first pressing parts 39c, 39d respectively press the back plates 15a and the second radial position P2 that is an abutting position between the radially outer side surfaces of the inner peripheral surfaces of the through holes 16a and the radially outer end parts of the outer peripheral surfaces of the pins 11a.

In this example, a force (Fx2) directed toward the axially outer side acts on the inner pad 3a and the outer pad 4a from only the second pressing parts 42c, 42d. Therefore, a reaction force against the force (Fx2) directed to the axially outer side and acting on the back plates 15a from the second pressing parts 42c, 42d acts on the abutting portions between the first pressing parts 39c, 39d and the outer peripheral edges of the back plates 15a and the abutting portions between the through holes 16a and the pins 11a. Specifically, a reaction force corresponding to the product of the force (Fy) directed toward the radially inner side and acting on the back plates 15a from the first pressing parts 39c, 39d and a friction coefficient (μ1) between the first pressing parts 39c, 39d and the back plates 15a {f1=pressing force (Fy)×friction coefficient (μ1)} acts on the abutting portions between the first pressing parts 39c, 39d and the outer peripheral edges of the back plates 15a. On the other hand, a reaction force corresponding to the product of the force (Fy) directed toward the radially inner side and acting on the back plates 15a from the first pressing parts 39c, 39d and the friction coefficient (μ2) between the through holes 16a and the pins 11a {f2=pressing force (Fy)×friction coefficient (μ2)} acts on the abutting portions between the radially outer side surfaces of the inner peripheral surfaces of the through holes 16a and the radially outer end parts of the outer peripheral surfaces of the pins 11a.

Therefore, in the present example, in order to separate the inner pad 3a and the outer pad 4a from each other in the axial direction (X), the force (Fx2) directed toward the axially outer side, which is applied to the back plates 15a from the second pressing parts 42c, 42d are set to no less than a total of the reaction force (f1) acting on the he abutting portions between the first pressing parts 39c, 39d and the back plates 15a and the reaction force (f2) acting on the abutting portions between the through holes 16a and the pins 11a (Fx2≥f1+f2).

In order to separate the inner pad 3a and the outer pad 4a from each other in the axial direction (X) without causing inclination of the inner pad 3a or the outer pad 4a, the third radial position P3 is preferably set such that a ratio of the reaction force (f1) acting on the he abutting portions between the first pressing parts 39c, 39d and the back plates 15a to the reaction force (f2) acting on the abutting portions between the through holes 16a and the pins 11a is the same as a ratio of a radial distance (L1) from the third radial position P3 to the first radial position P1 to a radial distance (L2) from the third radial position P3 to the second radial position P2 (f1:f2=L1:L2). In this example, since the friction coefficient (μ1) between the first pressing parts 39c, 39d and the back plates 15a and the friction coefficient (μ2) between the through holes 16a and the pins 11a are substantially the same, the third radial position P3 is disposed in the vicinity of the central part C between the first radial position P1 and the second radial position P2.

In the present example as described above, the inner pad 3a and the outer pad 4a can be separated from each other in the axial direction (X) without causing inclination of the inner pad 3a or the outer pad 4a by the second pressing parts 42c, 42d alone.

Other configurations and operational effects are the same as those of the first example of the embodiment.

The disc brake pad spring of the present invention is not limited to the opposed-piston type disc brake device as described in the embodiment, and can also be applied to a floating caliper type disc brake device. Further, the support structure of the pads on the pad support member at the peripheral-direction other-side part of the disc brake device is not limited to the structures described in the examples of the embodiment in which the convex ear portions are engaged with the guide grooves, and other support structures such as a structure that supports the pads using pins, for example, can be adopted.

Here, features of the disc brake pad spring and the disc brake device according to the present invention described above will be briefly summarized below.

1. A disc brake pad spring configured to be attached to a disc brake device (1a) in which a pair of pads (inner pad 3a and outer pad 4a) located to sandwich a rotor (5) are supported with respect to a pad support member (caliper 2a) by inserting in an axial direction (X) pins (11a) provided on the pad support member into a through hole (16a) formed in a radially inner side part of a peripheral-direction one-side part of a back plate (15a) of each of the pair of pads, and the peripheral-direction one-side part is disposed at a one side of the back plate in a peripheral direction of the rotor, and configured to elastically press the pair of pads against the pad support member, in which the disc brake pad spring (pad spring 23, 23a) is formed by a single metal plate, and includes:

a pair of first pressing parts (39a, 39b, 39c, 39d) configured to press a peripheral-direction one-side part of an outer peripheral edge of the respective back plates of each of the pair of pads toward a radially inner side, and a pair of second pressing parts (42a, 42b, 42c, 42d) configured to press a peripheral-direction one-side surface of the respective back plates of each of the pair of pads toward the other side in the peripheral direction, and the peripheral-direction one-side surface is disposed at the one side of the back plate in the peripheral direction.

2. The disc brake pad spring (pad spring 23, 23a) according to [1], in which the pair of second pressing parts (42a, 42b, 42c, 42d) are configured to press the pair of pads (inner pad 3a and outer pad 4a) in directions away from each other in the axial direction (X).

3. The disc brake pad spring (pad spring 23, 23a) according to [2], in which a radial position (third radial position P3) in which the pair of second pressing parts (42a, 42b, 42c, 42d) respectively press the back plates (15a) is located between a first radial position (P1) on which the pair of first pressing parts (39a, 39b, 39c, 39d) respectively press the back plate and a second radial position (P2) that is an abutting position between inner peripheral surfaces of the through holes (16a) and radially outer side parts of outer peripheral surfaces of the pins (11a).

4. The disc brake pad spring (pad spring 23) according to [3], in which when the pair of first pressing parts (39a, 39b) press the pair of pads (inner pad 3a and outer pad 4a) in the directions away from each other in the axial direction (X), the pair of second pressing parts (42c, 42d 42a, 42b) respectively press portions closer to the second radial position (P2) than a central part (C1) between the first radial position (P1) and the second radial position.

5. The disc brake pad spring (pad spring 23a) according to [3], in which when the pair of first pressing parts (39c, 39d) do not press the pair of pads (inner pad 3a and outer pad 4a) in the directions away from each other in the axial direction (X), the pair of second pressing parts (42c, 42d) respectively press the vicinity of a central part (C1) between the first radial position (P1) and the second radial position (P2).

6. The disc brake pad spring (pad spring 23) according to any one of [1] to [2], in which the pair of first pressing parts (39a, 39b) are configured to press the pair of pads (inner pad 3a and outer pad 4a) in directions away from each other in the axial direction (X).

7. The disc brake pad spring (pad spring 23, 23a) according to any one of [1] to [6], in which the back plate (15) of each of the pair of pads (inner pad 3a and outer pad 4a) has a torque transmission surface (19a) in the peripheral-direction one-side surface, and the torque transmission surface abuts against a torque receiving surface (18a) provided on the pad support member (caliper 2a) so as to bear a brake tangential force acting on each of the pair of pads during reverse braking, and the disc brake pad spring further includes a pair of sandwiched portions, the pair of sandwiched portions (32) each being disposed between the torque transmission surface and the torque receiving surface.

8. The disc brake pad spring (pad spring 23, 23a) according to any one of [1] to [7], in which each of the pair of first pressing parts (39a, 39b, 39c, 39d) is configured to press a part of the outer peripheral edge of the back plate (15a) that overlaps in a radial direction with the pin (11a).

9. A disc brake device (1a), including:

a pair of pads (inner pad 3a and outer pad 4a) each including a lining (14a) and a back plate (15a) that supports a back surface of the lining, and located to sandwich a rotor (5);

a pad support member (caliper 2a) that supports the pair of pads to be movable in an axial direction (X); and a disc brake pad spring configured to elastically press the pair of pads, in which each of the back plates of the pair of pads has a through hole (16a) on a radially inner side part of a peripheral-direction one-side part, the pad support member includes a pair of pins (11a) inserted into the respective through holes in the axial direction, and the disc brake pad spring is the disc brake pad spring according to any one of [1] to [8] (pad spring 23, 23a).

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

The present application is based on Japanese Patent Application No. 2018-177896 filed on Sep. 21, 2018, the contents of which are incorporated herein by reference.

INDUSTRIAL APPLICABILITY

According to the disc brake pad spring and the disc brake device of the present invention, it is possible to prevent occurrence of brake noise in the non-braking state. Further, it is possible to prevent occurrence of abnormal noise based on collision between a through hole formed in a back plate of a pad and a pin provided on a pad support member during forward braking

REFERENCE SIGNS LIST 1, 1a disc brake device
2, 2a caliper (pad support member)
3, 3a inner pad
4, 4a outer pad
5 rotor
6, 6a inner body
7, 7a outer body
8, 8a rotation-in side coupling part
9, 9a rotation-out side coupling part
10, 10a, 10b center bridge
11, 11a pin
12 guide groove
13 guide wall
14, 14a lining
15, 15a back plate
16, 16a through hole
17, 17a ear portion
18, 18a torque receiving surface
19, 19a torque transmission surface
20 pad spring
21a, 21b rotation-in side pressing part
22a, 22b rotation-out side pressing part
23, 23a pad spring (disk brake pad spring)
24 window portion 25 inner cylinder
26 outer cylinder
27 mounting seat
28 protruding portion
29 projecting portion
30 locking portion
31 first bifurcated portion
32 sandwiched portion
33 second bifurcated portion
34 coupling plate portion
35 push-up plate portion
36 upright plate portion
37 bent-up portion
38 first base plate portion
39a, 39b, 39c, 39d first pressing part
40a, 40b, 40c, 40d first fold-back portion
41 second base plate portion
42a, 42b, 42c, 42d second pressing part
43a, 43b, 43c, 43d second fold-back portion

The invention claimed is:

1. A disc brake pad spring configured to be attached to a disc brake device in which a pair of pads located to sandwich a rotor are supported with respect to a pad support member by inserting in an axial direction pins provided on the pad support member into a through hole formed in a radially inner side of a peripheral-direction side of a back plate of each of the pair of pads, and the peripheral-direction side is located at a one side of the back plate in a peripheral direction of the rotor, and the disc brake pad spring configured to elastically press the pair of pads against the pad support member, wherein
the disc brake pad spring is formed by a single metal plate, and comprises:
a first bifurcated portion including a first base plate portion and a pair of first pressing parts, the pair of first pressing parts extend from two axial ends of the first base plate portion toward an other peripheral-direction side of the rotor, the other peripheral-direction side is located at an other side of the back plate in the peripheral direction of the rotor, the pair of first pressing parts configured to press an outer peripheral edge of the peripheral-direction side of the respective back plates of each of the pair of pads toward a radially inner side of the rotor, and each first pressing part including a first fold-back potion that fold back toward the radially inner side and toward the peripheral-direction side, and
a second bifurcated portion including a pair of second pressing parts configured to press a surface of the respective back plates of each of the pair of pads toward the other peripheral-direction side in the peripheral direction of the rotor, and the surface is disposed at the one side of the back plate in the peripheral direction of the rotor.

2. The disc brake pad spring according to claim 1, wherein the pair of second pressing parts are configured to press the pair of pads in directions away from each other in the axial direction.

3. The disc brake pad spring according to claim 2, wherein a position in which the pair of second pressing parts respectively press the back plates is located, in a radial direction of the rotor, between a first radial position on which the pair of first pressing parts respectively press the back plate and a second radial position that is an abutting position between inner peripheral surfaces of the through hole and radially outer side parts of outer peripheral surfaces of the pins.

4. The disc brake pad spring according to claim 3, wherein when the pair of first pressing parts press the pair of pads in the directions away from each other in the axial direction, the pair of second pressing parts respectively press portions, in the radial direction of the rotor, closer to the second radial position than a central part, in the radial direction of the rotor, between the first radial position and the second radial position.

5. The disc brake pad spring according to claim 3, wherein when the pair of first pressing parts do not press the pair of pads in the directions away from each other in the axial direction, the pair of second pressing parts press a central part, in the radial direction of the rotor, between the first radial position and the second radial position.

6. The disc brake pad spring according to claim 1, wherein the pair of first pressing parts are configured to press the pair of pads in directions away from each other in the axial direction.

7. The disc brake pad spring according to claim 1, wherein the back plate of each of the pair of pads has a torque transmission surface in the surface of the respective back plates, and the torque transmission surface abuts against a torque receiving surface provided on the pad support member so as to bear a brake tangential force acting on each of the pair of pads during reverse braking, and
the disc brake pad spring further comprises a pair of sandwiched portions, the pair of sandwiched portions each being disposed between the torque transmission surface and the torque receiving surface.

8. The disc brake pad spring according to claim 1, wherein each of the pair of first pressing parts is configured to press a part of the outer peripheral edge of the back plate that overlaps in a radial direction with the pins.

9. A disc brake device, comprising:
a pair of pads each including a lining and a back plate that supports a back surface of the lining, and located to sandwich a rotor;
a pad support member that supports the pair of pads to be movable in the axial direction; and
a disc brake pad spring configured to elastically press the pair of pads, wherein
each of the back plates of the pair of pads has a through hole on the radially inner side of the peripheral-direction side,
the pad support member includes a pair of pins inserted into the respective through holes in the axial direction, and
the disc brake pad spring is the disc brake pad spring according to claim 1.

* * * * *